United States Patent
Yoshikawa et al.

(10) Patent No.: US 7,580,598 B2
(45) Date of Patent: Aug. 25, 2009

(54) OPTICAL SIGNAL PROCESSING DEVICE, INFORMATION RECORDING/REPRODUCING APPARATUS AND INFORMATION RECORDING/REPRODUCING SYSTEM

(75) Inventors: Jun Yoshikawa, Kanagawa (JP); Tomohisa Shiga, Kanagawa (JP); Keisuke Hisano, Kanagawa (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 11/404,915

(22) Filed: Apr. 14, 2006

(65) Prior Publication Data

US 2006/0233058 A1    Oct. 19, 2006

(30) Foreign Application Priority Data

Apr. 15, 2005    (JP)    ............................ P2005-119091

(51) Int. Cl.
*G02B 6/26*   (2006.01)
*G02B 6/42*   (2006.01)
*G06F 15/167* (2006.01)
*G06F 15/16*  (2006.01)

(52) U.S. Cl. .......................... 385/16; 709/212; 709/250
(58) Field of Classification Search ............ 369/112.27; 385/16–23; 709/212, 250

See application file for complete search history.

(56) References Cited

U.S. PATENT DOCUMENTS 6,502,108 B1 *    12/2002    Day et al. .................... 707/203

FOREIGN PATENT DOCUMENTS

| JP | 8 79732    | 3/1996  |
|----|------------|---------|
| JP | 2000 181887 | 6/2000  |
| JP | 2000 316132 | 11/2000 |
| JP | 2001 22526 | 1/2001  |
| JP | 2001 211412 | 8/2001  |
| JP | 2001 306414 | 11/2001 |
| JP | 2004 265548 | 9/2004  |
| JP | 2005 33690 | 2/2005  |

\* cited by examiner

*Primary Examiner*—Uyen Chau N Le
*Assistant Examiner*—John M Bedtelyon
(74) *Attorney, Agent, or Firm*—Frommer Lawrence & Haug LLP; William S. Frommer; Thomas F. Presson

(57) ABSTRACT

Optical signal processing device that processes an optical signal based on predetermined data has a first terminal for inputting and outputting the optical signal, which is connected to a first channel of optical communication line, a second terminal for inputting and outputting the optical signal, which is connected to a second channel of optical communication line, and a switch portion for optical communication, which is connected to the first and second terminals. The switch portion chooses any one of the first and second channels of the optical communication lines without depending on any external fiber channel hub and any fiber channel switch.

2 Claims, 12 Drawing Sheets

OPTICAL SIGNAL PROCESSING DEVICE, INFORMATION RECORDING/REPRODUCING APPARATUS AND INFORMATION RECORDING/REPRODUCING SYSTEM

CROSS REFERECE TO RELATED APPLICATION

The present invention contains subject matter related to Japanese Patent Application No. JP2005-119091 filed in the Japanese Patent Office on Apr. 15, 2005, the entire contents of which being incorporated herein by reference.

BACKGROUND OF THE INVENTION

1. Field of the Invention

The present invention relates to an optical signal processing device, an information recording/reproducing apparatus and information recording/reproducing system. More particularly, it relates to an audio and video (AV) sever or the like that records audio and video (AV) data stream in a data storage device through a fiber channel (an optical communication line) and/or reproduces the AV data therefrom.

2. Description of Related Art

Recently, the AV server has been often used in a broadcast station, an audio and video information distribution system or the like when editing any audio and video information. The AV server has a data recording/reproducing apparatus, a data storage device and the like. The data recording/reproducing apparatus encodes and compresses any audio and video information according to a predetermined data compression standard when recording the data. Additional information such as header information is added to the coded and compressed audio and video data, thereby producing a data stream. The data recording/reproducing apparatus is connected to the data storage device through an optical communication line (hereinafter referred to as "fiber channel"), in order to enable the data stream to be transmitted at high speeds. The data storage device stores the data stream with a predetermined data format.

The data recording/reproducing apparatus reads the data stream out of the data storage device when reproducing the data, to decode and decompress the data stream. Any decoded and decompressed audio and video data is used as audio and video information. The data recording/reproducing apparatus transmits such the audio and video information to a monitor.

If plural data recording/reproducing apparatuses (originators) are connected to one data storage device in a data recording/reproducing system using such the data storage device, an arbitrated loop topology connection or a fabric topology connection has been often adopted. When the arbitrated loop topology connection is used, a fiber channel hub is used or a physical loop is formed with a transmission line without using any fiber channel hub.

FIGS. 1A and 1B show data recording/reproducing systems 61, 62 relative to related art. Each of the data recording/reproducing systems 61, 62 use the arbitrated loop topology connection.

The data recording/reproducing system 61 shown in FIG. 1A has data recording/reproducing apparatuses 201, 202, a data storage device 301, and a fiber channel hub 601. The fiber channel hub 601 has two ports at its data recording/reproducing side and is connected to the two data recording/reproducing apparatuses 201, 202 through the ports. The fiber channel hub 601 also has a port at its data storage side and is connected to the data storage device 301 through the port.

The data recording/reproducing system 62 shown in FIG. 1B has data recording/reproducing apparatuses 201, 202 and a data storage device 301. In the data recording/reproducing system 62 shown in FIG. 1B, a physical loop is formed with a transmission line without using any fiber channel hub. In this loop, the data recording/reproducing apparatus 201 is connected to the recording/reproducing apparatuses 202 as well as the data recording/reproducing apparatuses 201, 202 are connected to the data storage device 301.

FIGS. 2A and 2B show data recording/reproducing systems 63, 64 relative to related art. Each of the data recording/reproducing systems 63, 64 use the fabric topology connection.

The data recording/reproducing system 63 shown in FIG. 2A has data recording/reproducing apparatuses 201, 202, a data storage device 301, and a fiber channel switch 602. The fiber channel switch 602 has a port at its data storage side and is connected to the data storage device 301 through the port. The fiber channel switch 602 also has two ports at its data recording/reproducing side and is connected to the two data recording/reproducing apparatuses 201, 202 through the ports.

The data recording/reproducing system 64 shown in FIG. 2B has a data recording/reproducing apparatus 201, data storage devices 301, 302, and a fiber channel switch 602'. The fiber channel switch 602' has two ports at its data storage side and is connected to the two data storage devices 301, 302 through the ports. The fiber channel switch 602' has a port at its data recording/reproducing side and is connected to the data recording/reproducing apparatus 201 through the port.

FIGS. 3A and 3B show data recording/reproducing systems 65, 66 relative to related art. The data recording/reproducing systems 65, 65 use the arbitrated loop topology connection.

The data recording/reproducing system 65 shown in FIG. 3A has a data recording/reproducing apparatus 201, two data storage devices 301, 302, and a fiber channel hub 601'. The fiber channel hub 601' has two ports at its data storage side and is connected to the data storage devices 301, 302 through the ports. The fiber channel hub 601' also has a port at its data recording/reproducing side and is connected to the data recording/reproducing apparatus 201 through the port.

The data recording/reproducing system 66 shown in FIG. 3B has a data recording/reproducing apparatus 201 and data storage devices 301, 302. In the data recording/reproducing system 66 shown in FIG. 3B, a physical loop is formed with a transmission line without using any fiber channel hub. In this loop, the data recording/reproducing apparatus 201 is connected to the two data storage devices 301, 302 as well as the data storage device 301 is connected to the data storage device 302.

Such the data recording/reproducing system may have a tape library device (Japanese Patent Application Publication No.2004-265548). The tape library device has a host computer, a tape library, and a fiber channel switch positioned between the host computer and the tape library. At upper hierarchy of the fiber channel switch, the host computer is connected to the fiber channel switch through the fiber channel while at lower hierarchy of the fiber channel switch, two kinds of fiber channel drivers are connected to the fiber channel switch through the fiber channel, in order to allows the fiber channel drivers to be exchanged and used without rebooting the host computer.

SUMMARY OF THE INVENTION

In the above data recording/reproducing systems 61, 65, the fiber channel hubs 601, 601' are used, thereby increasing cost thereof.

On the above data recording/reproducing systems 62, 66, if any equipment in the loop is troubled or shut down in its power, the entire loop stops, thereby causing other equipment to stop its operation.

In the above data recording/reproducing systems 63, 64, the fiber channel switches 602, 602' are used, thereby increasing cost thereof.

On the above data recording/reproducing systems 61, 62, 65, and 66, any arbitration is carried out for every time of access to decide a priority of usage in the loop. This may result in complex communication protocol and performance deterioration when accesses from plural originators occur.

Thus, if two data recording/reproducing apparatuses 201, 202 are used in the data recording/reproducing systems 61 to 63 in which one data storage device is used, it is necessary that an external fiber channel hub 601 or an external fiber channel switch 602 is added to the system or the arbitrated loop topology connection, which has complex communication protocol and appears less performance, is adopted.

Further, if one data recording/reproducing apparatus (hereinafter also referred to as "optical signal processing device") 201 is used in the data recording/reproducing systems 64 to 66 in which two data storage devices (hereinafter also referred to as "optical signal processing storage devices") 301, 302 are used, it is necessary that an external fiber channel hub 601' or an external fiber channel switch 602' is added to the system or the arbitrated loop topology connection, which has complex communication protocol and appears less performance, is adopted.

It is desirable to provide an optical signal processing device, an information recording/reproducing apparatus and an information recording/reproducing system that are possible to choose between an optical signal processing device and the other optical signal processing device without depending on any external fiber channel hub or any external fiber channel switch, and decrease a number of parts relative to an input/output terminal for optical communication and an optical signal conversion element, as compared with a case where a single component exhibiting any switch function for optical communication is separately configured.

According to an embodiment of the invention, there is provided an optical signal processing device that processes an optical signal based on predetermined data. The optical signal processing device has a first terminal that inputs and outputs the optical signal. The optical signal processing device is connected to a first channel of optical communication line. The optical signal processing device has a second terminal that inputs and outputs the optical signal. The second terminal is connected to a second channel of optical communication line. The optical signal processing device has a switch portion for optical communication that switches between the first and second channels of the optical communication lines. The switch portion is connected to the first and second terminals.

In the embodiment of the optical signal processing device according to the invention, if performing the optical signal based on predetermined data, the switch portion is connected to the first terminal connected to a first channel of optical communication line, which inputs and outputs the optical signal, and a second terminal connected to a second channel of optical communication line, which inputs and outputs the optical signal, and switches between the first channel of optical communication line and the second channel of optical communication line.

Thus, it is possible to select any one of an optical signal processing device connected to the first channel of optical communication line and the other optical signal processing device connected to the second channel of optical communication line. Such the optical communication line selection function is sufficiently applied to an information recording/reproducing apparatus, a data storage device and the like.

According to another embodiment of the invention, there is provided an information recording/reproducing apparatus. The apparatus has a recording/reproducing device that performs any one of recording and reproducing on a data stream with a predetermined data format and an optical signal processing device that processes an optical signal based on the data stream. The optical signal processing device includes a first terminal connected to a first channel of optical communication line, which inputs and outputs the optical signal. The optical signal processing device also includes a second terminal connected to a second channel of optical communication line, which inputs and outputs the optical signal. The optical signal processing device further includes an optical signal processing portion that processes the optical signal and a switch portion for optical communication that switches between the first and second channels of the optical communication lines. The switch portion is connected to the first and second terminals and the optical signal processing portion.

To the embodiment of the information recording/reproducing apparatus according to the invention, an embodiment of the optical signal processing device according to the invention is applied. On the assumption of this, the recording/reproducing device performs recording and/or reproducing on a data stream with a predetermined data format. The optical signal processing device processes the optical signal based on the data stream. The switch portion is connected to the first terminal connected to a first channel of optical communication line, which inputs and outputs the optical signal, and a second terminal connected to a second channel of optical communication line, which inputs and outputs the optical signal, and switches between the first channel of optical communication line and the second channel of optical communication line.

Thus, the embodiment of the information recording/reproducing apparatus illustratively can select any one of the data storage device that is connected to the first channel of the optical communication line and another information recording/reproducing apparatus that is connected the second channel of the optical communication line, without depending on an external fiber channel hub and an external fiber channel switch. It is also possible to decrease a number of parts relative to an input/output terminal for optical communication and an optical signal conversion element, as compared with a case where a single component such as the fiber channel hub or the fiber channel switch exhibiting any switch function for optical communication is separately configured. The embodiment of the above information recording/reproducing apparatus according to the invention can be configured at a low price.

According to further embodiment of the invention, there is provided an information recording/reproducing system. The system has a data storage device that stores a data stream with a predetermined data format and information recording/reproducing apparatus that is connected to the data storage device through an optical communication line. The information recording/reproducing apparatus includes a recording/reproducing portion that performs any one of recording and reproducing on the data stream and an optical signal processing portion that processes an optical signal based on the data stream. The information recording/reproducing apparatus also has a first terminal connected to a first channel of optical communication line, which inputs and outputs the optical signal, and a second terminal connected to a second channel of optical communication line, which inputs and outputs the optical signal. The information recording/reproducing apparatus further has a switch portion for optical communication that switches between the first and second channels of the optical communication lines. The switch portion is connected to the first and second terminals and the optical signal processing portion.

To the embodiment of the information recording/reproducing system according to the invention, an embodiment of the above information recording/reproducing apparatus according to the invention is applied. Therefore, the information recording/reproducing system can selects any one of the data storage device that is connected to the first channel of the optical communication line and another information recording/reproducing apparatus that is connected the second channel of the optical communication line, without depending on an external fiber channel hub and an external fiber channel switch.

Thus, it is also possible to decrease a number of parts relative to an input/output terminal for optical communication and an optical signal conversion element, as compared with a case where a single component exhibiting any switch function for optical communication is separately configured. Further, an audio and video server system or the like to which the embodiment of the above information recording/reproducing apparatus according to the invention is applied can be configured at a low price.

The concluding portion of this specification particularly points out and directly claims the subject matter of the present invention. However that skill in the art will best understand both the organization and method of operation of the invention, together with further advantages and objects thereof, by reading the remaining portions of the specification in view of the accompanying drawing(s) wherein like reference characters refer to like elements.

DESCRIPTION OF THE INVENTION

Figure 1A:
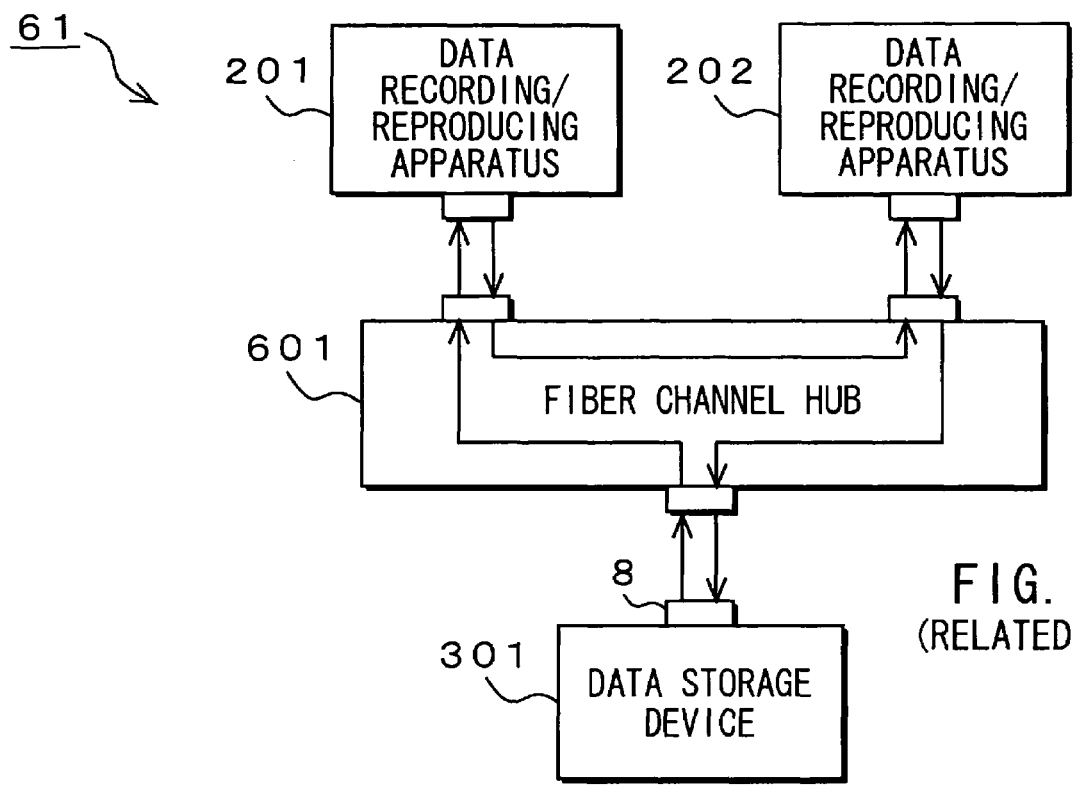
FIGS. 1A and 1B are block diagrams for showing configurations of data recording/reproducing systems 61 and 62 relative to related art.
Figure 1B:
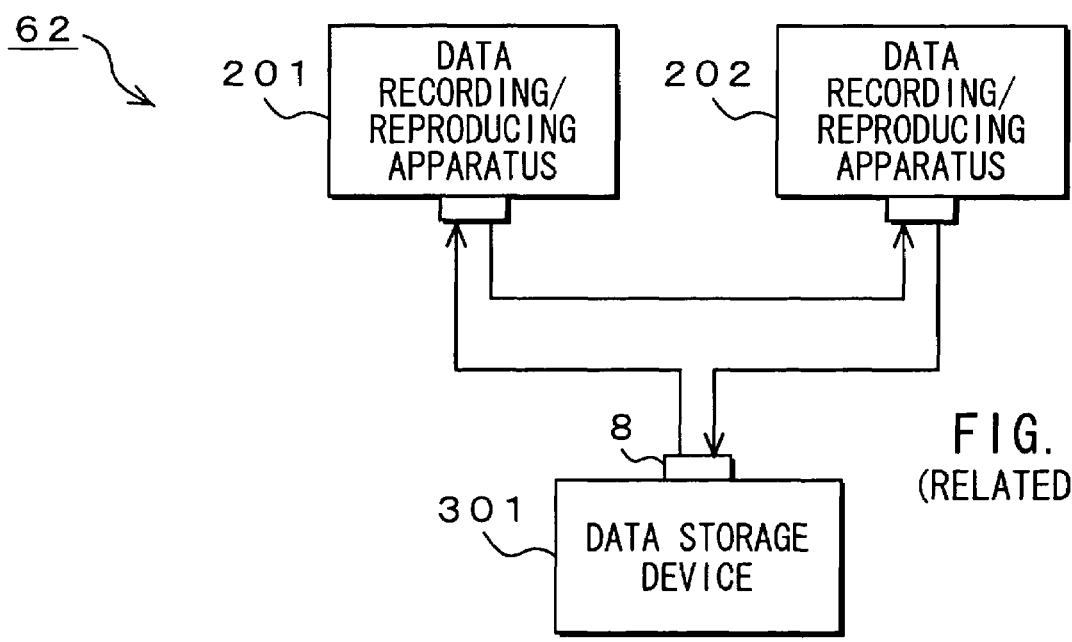
Figure 2A:
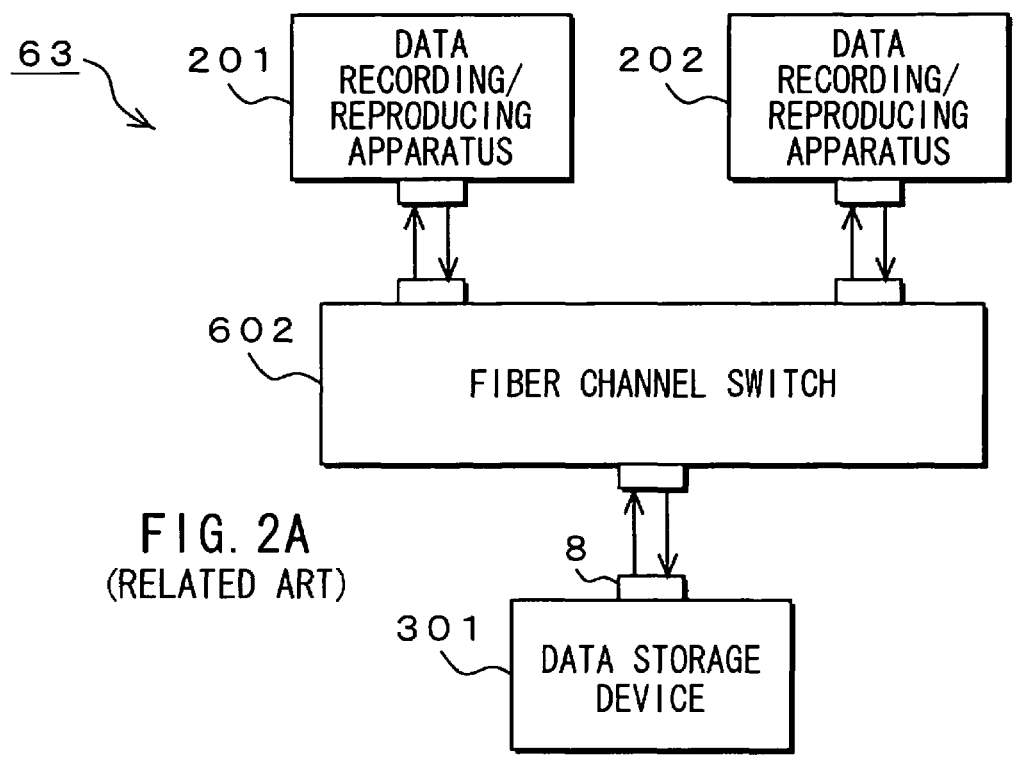
FIGS. 2A and 2B are block diagrams for showing configurations of data recording/reproducing systems 63 and 64 relative to related art.
Figure 2B:
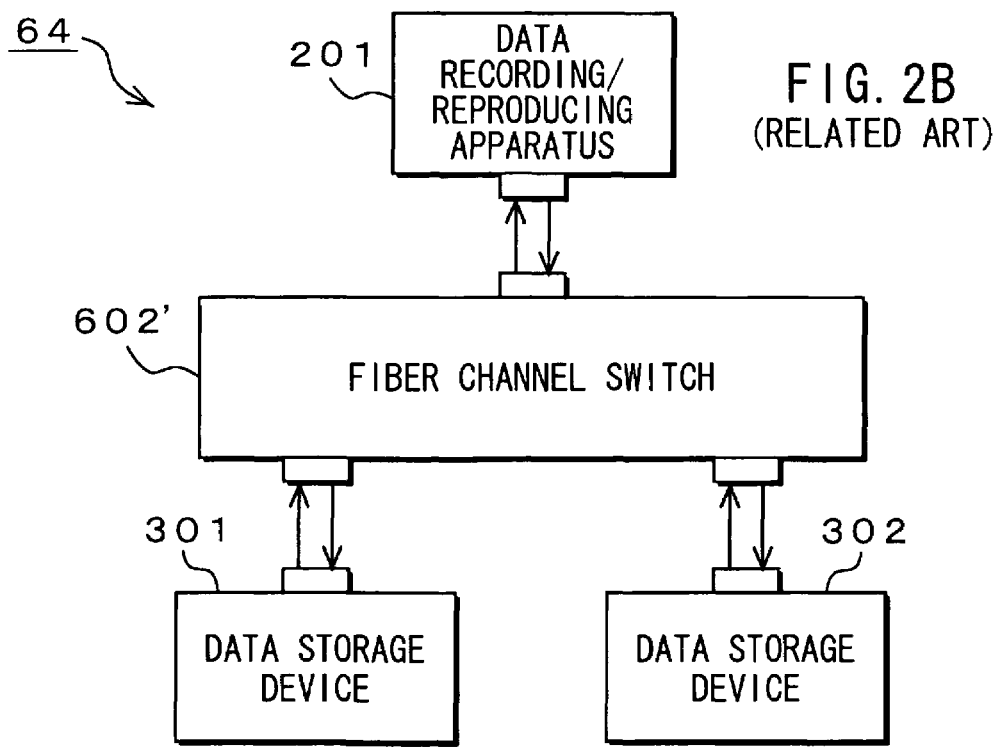
Figure 3A:
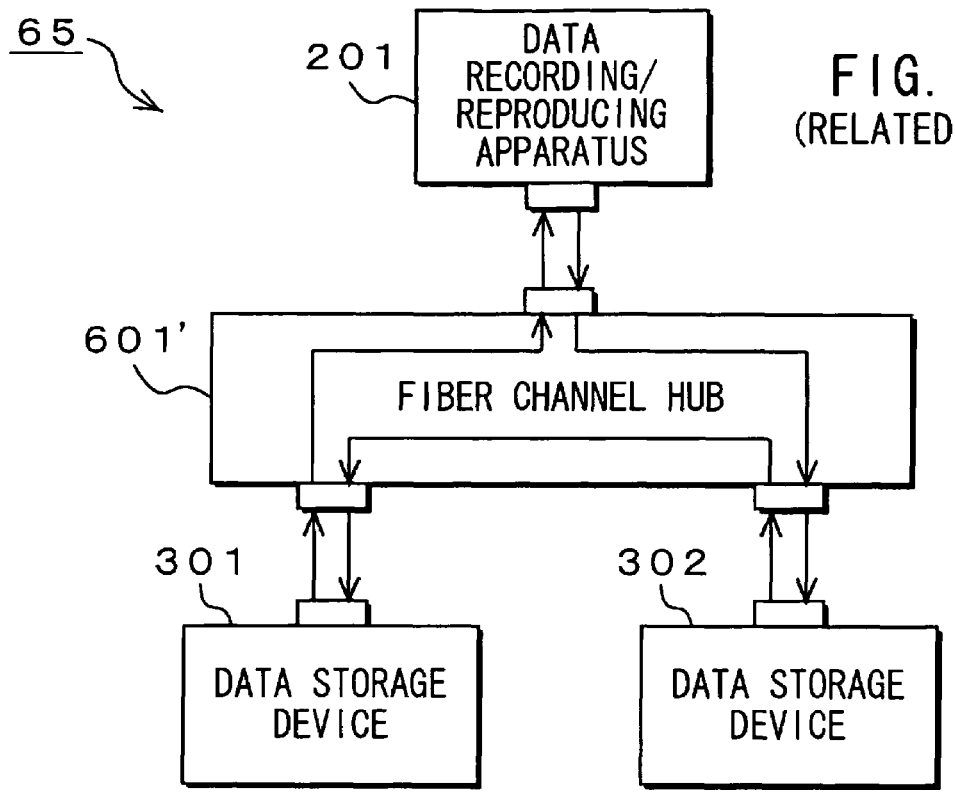
FIGS. 3A and 3B are block diagrams for showing configurations of data recording/reproducing systems 65 and 66 relative to related art.
Figure 3B:
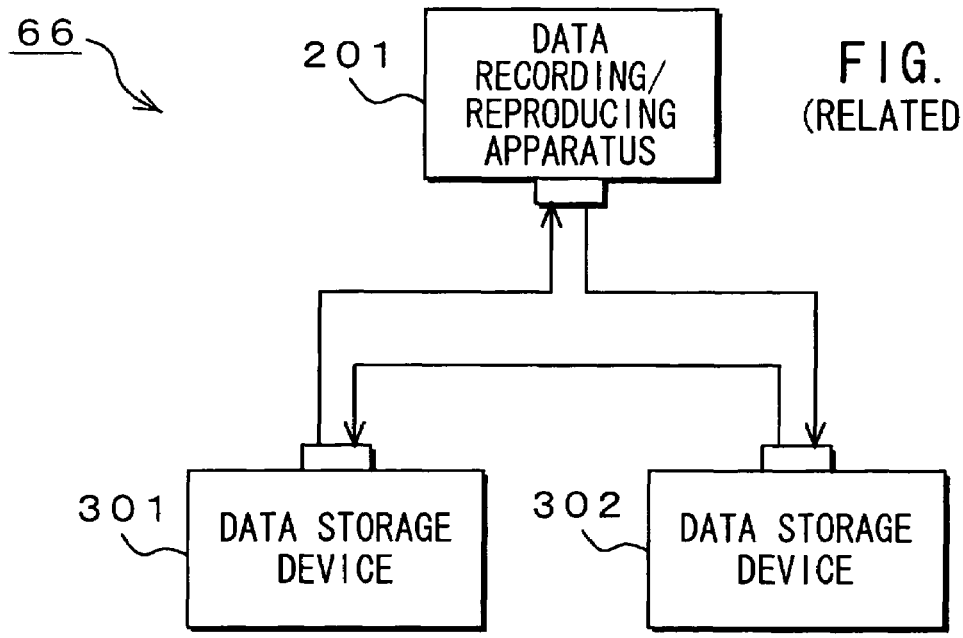

Referring now to the drawings, preferred embodiments of an optical signal processing device, an information recording/reproducing apparatus, and an information recording/reproducing system according to the invention will be described specifically below.

Figure 4:
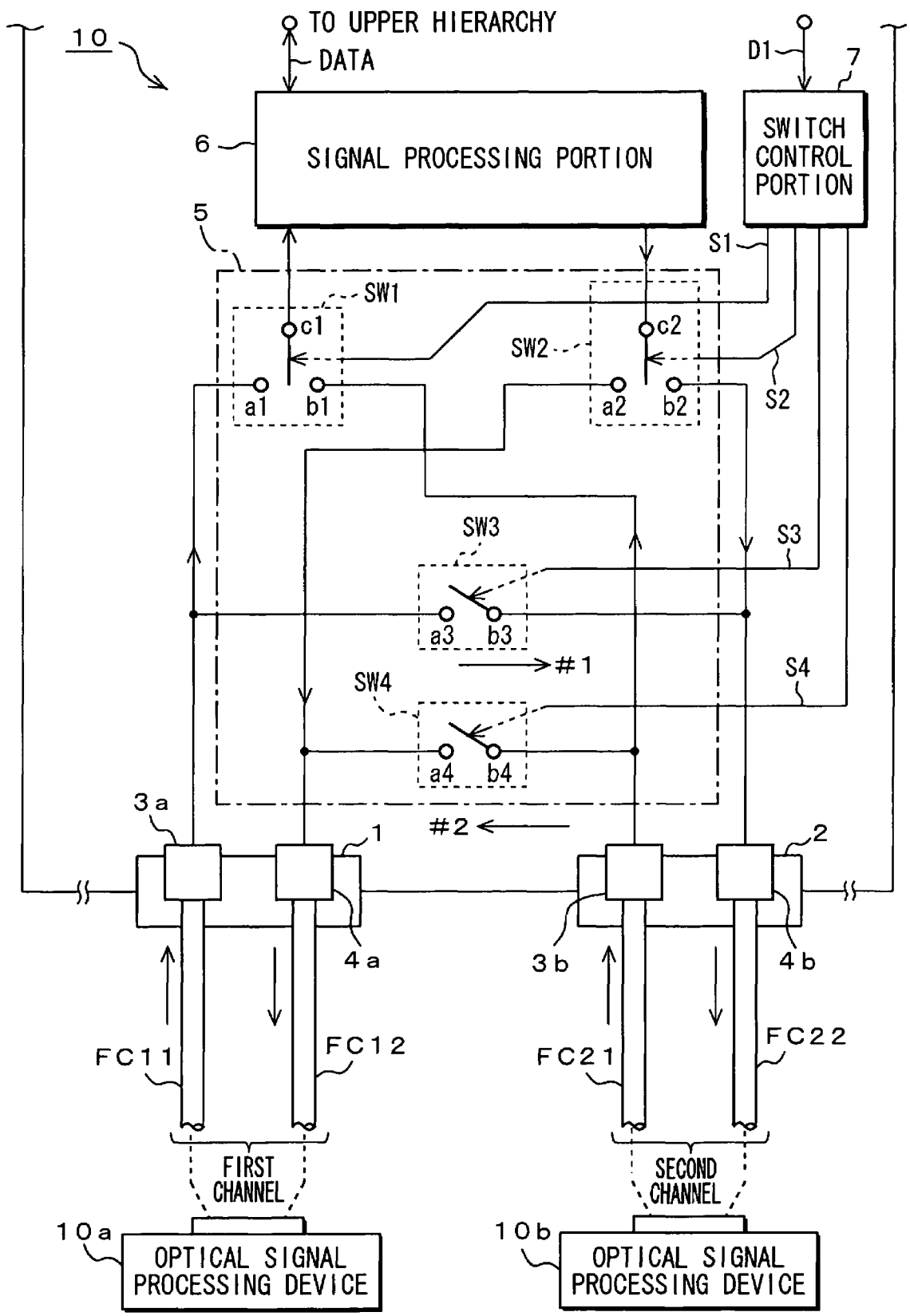
FIG. 4 is a block diagram for showing a configuration of an optical signal processing device as a first embodiment according to the invention.

FIG. 4 shows a configuration of the optical signal processing device 10 as a first embodiment according to the invention.

The optical signal processing device 10 as shown in FIG. 4 processes an optical signal based on predetermined data and is preferably applied to an AV sever or the like that records audio and video (AV) data stream in a data storage device through an optical communication line and/or reproduces the AV data therefrom.

The optical signal processing device 10 has a first terminal for inputting and outputting of optical communication (hereinafter referred to as "port 1"), a second terminal for inputting and outputting of optical communication (hereinafter referred to as "port 2"), a switch circuit array 5, a signal processing portion 6, and a switch control portion 7.

The port 1 is connected to a first channel of optical communication lines (hereinafter referred to as "first fiber channels FC 11, FC 12). The port 1 is equipped with a light-receiving element 3a and a light-emitting element 4a. The first fiber channel FC 11 is connected to the port 1 at its light-receiving element side while the first fiber channel FC 12 is connected to the port 1 at its light-emitting element side. The first fiber channels FC 11, FC 12 are connected to a first channel of optical signal processing device 10a.

The port 2 is connected to a second channel of optical communication lines (hereinafter referred to as "second fiber channels FC 21, FC22). The port 2 is equipped with a light-receiving element 3b and a light-emitting element 4b. As the light-receiving element 3a, 3b, semiconductor photo diode is used. As the light-emitting element 4a, 4b, semiconductor laser diode is used. The second fiber channel FC 21 is connected to the port 2 at its light-receiving element side while the second fiber channel FC 22 is connected to the port 2 at its light-emitting element side. The second fiber channels FC 21, FC 22 are connected to the second channel of optical signal processing device 10b.

The switch circuit array 5 for optical communication as an example of the switch portion is connected to the ports 1 and 2 to switch between the first and second fiber channels FC 11, FC 12, FC 21, and FC 22. The switch circuit array 5 includes switch circuits SW1 to SW4. By detecting Source ID, Destination ID and the like described in, for example, header information of the data, which is received and demodulated in the optical signal processing device 10a, the switch circuits SW1 to SW4 function to switch loading data into a control system of upper hierarchy or transmitting data to the other optical signal processing device 10b. The switch circuits SW1 to SW4 are constituted of a field programmable gate array (FPGA).

The switch circuits SW1 to SW4 are connected to the switch control portion 7. By decoding, for example, switch control data D1, switch control signals S1 to S4 are generated. The switch control data D1 is obtained by analyzing any header information for specifying destination of data and source of data. The switch control data D1 is supplied from a control terminal, which is not shown, a file manager (FM) personal computer, which is not shown, or a network interface (Net IF) personal computer, which is not shown, each having upper hierarchy. The switch control signal S1 is supplied to the switch circuit SW1. Similarly, the switch control signal S2 is supplied to the switch circuit SW2; the switch control signal S3 is supplied to the s witch circuit SW3; and the switch control signal S4 is supplied to the switch circuit SW4. The switch control data D1 is supplied from, for example, any control system with an upper hierarchy.

The switch circuit SW1 has connection points a1, b1 and a neutral point c1. The connection point a1 is connected to the light-receiving element 3a. The connection point b1 is connected to the light-receiving element 3b. The neutral point c1 is connected to an input (in) of the signal processing portion 6. The switch circuit SW1 performs switching operations based on the switch control signal S1 of two bits. For example, if S1=00, neutral is kept. If S1=10, the connection point a1 is connected to the neutral point c1 to select the light-receiving element 3a. If S1=11, the connection point b1 is connected to the neutral point c1 to select the light-receiving element 3b.

The switch circuit SW2 has connection points a2, b2 and a neutral point c2. The connection point a2 is connected to the light-emitting element 4a. The connection point b2 is connected to the light-emitting element 4b. The neutral point c2 is connected to an output (out) of the signal processing portion 6. The switch circuit SW2 also performs switching operations based on the switch control signal S2 of two bits. For example, if S2=00, neutral is kept. If S2=10, the connection point a2 is connected to the neutral point c2 to select the light-emitting element 4a. If S2=11, the connection point b2 is connected to the neutral point c2 to select the light-emitting element 4b.

The switch circuit SW3 has connection points a3, b3. The connection point a3 is connected to the light-receiving element 3a and the connection point b3 is connected to the light-emitting element 4b. The switch circuit SW3 performs any on-and-off control based on the switch control signal S3. For example, if S3=0, the switch circuit SW3 is OFF while if S3=1, the switch circuit SW3 is ON.

The switch circuit SW4 has connection points a4, b4. The connection point a4 is connected to the light-emitting element 4a and the connection point b4 is connected to the light-receiving element 3b. The switch circuit SW4 also performs any on-and-off control based on the switch control signal S4. For example, if S4=0, the switch circuit SW4 is OFF while if S4=1, the switch circuit SW4 is ON. The following table 1 shows an example of operations of switch circuits SW1 to SW4.

TABLE 1

| CONTROL ITEMS | STATES OF SWITCH CONNECTION SW1-SW4 | | REMARKS |
|---|---|---|---|
| SELECTION OF FIRST CHANNEL | SW1 → a1 | SW2 → a2 | SW3 = OFF |
| SELECTION OF SECOND CHANNEL | SW1 → b1 | SW2 → b2 | SW4 = OFF |
| BYPASS   LOOP#1 | SW3 = ON | | SW1, SW2 |
|          LOOP#2 | SW4 = ON | | NEUTRAL |
| MONITOR | SW3 = ON SW1 → a1 or b1 | | |
|         | SW4 = ON SW2 → a2 or b2 | | |

The following describe operations of the switch circuit array 5 in the optical signal processing device 10.

(When selecting the First Channel)

The switch control portion 7 supplies the switch control signal, S1=10, to the switch circuit SW1 and the switch control signal, S2=10, to the switch circuit SW2. In this moment, the switches SW3, SW4 are kept OFF. As a result thereof, when S1=10, the connection point a1 is connected to the neutral point c1 so that the light-receiving element 3a can be selected and driven. When S2=10, the connection point a2 is connected to the neutral point c2 so that the light-emitting element 4a can be selected and driven. Such the control of the switch circuit array 5 allows the optical signal processing device 10a that is connected to the first channel to be selected. This enables the signal processing portion 6 to transmit and/or receives an optical signal to and/or from the optical signal processing device 10a.

(When Selecting the Second Channel)

The switch control portion 7 supplies the switch control signal, S1=11, to the switch circuit SW1 and the switch control signal, S2=11, to the switch circuit SW2. In this moment, the switches SW3, SW4 are kept OFF. As a result thereof, when S1=11, the connection point b1 is connected to the neutral point c1 so that the light-receiving element 3b can be selected and driven. When S2=11, the connection point b2 is connected to the neutral point c2 so that the light-emitting element 4b can be selected and driven. Such the control of the switch circuit array 5 allows the optical signal processing device 10b that is connected to the second channel to be selected. This enables the signal processing portion 6 to transmit and/or receives an optical signal to and/or from the optical signal processing device 10b.

(When Selecting the Bypass Loop #1)

The switch control portion 7 supplies the switch control signal, S1=00, to the switch circuit SW1 and the switch control signal, S2=00, to the switch circuit SW2. In this case, the neutral points c1, c2 are kept neural. In other words, all the connection points a1, b1, a2, and b2 are unselected. The switch control portion 7 also supplies the switch control signal, S3=1, to the switch circuit SW3. In this moment, the switch circuit SW4 is kept OFF. As a result thereof, when S3=1, the connection point a3 is connected to the connection point b3 so that the light-receiving element 3a can be connected to the light-emitting element 4b to connect its output to the light-emitting element 4b.

Such the control of the switch circuit array 5 allows the optical signal processing device 10a that is connected to the first channel to be connected to the optical signal processing device 10b that is connected to the second channel with bypassing the signal processing portion 6. This enables the optical signal processing device 10a to transmit an optical signal to the optical signal processing device 10b.

(When Selecting the Bypass Loop #2)

Similar to a case where selecting the Bypass Loop #1, the switch control portion 7 supplies the switch control signal, S1=00, to the switch circuit SW1 and the switch control signal, S2=00, to the switch circuit SW2. The switch control portion 7 also supplies the switch control signal, S4=1, to the switch circuit SW4. In this moment, the switch circuit SW3 is kept OFF. As a result thereof, when S4=1, the connection point a4 is connected to the connection point b4 so that the light-receiving element 3b can be connected to the light-emitting element 4a to connect its output to the light-emitting element 4a.

Such the control of the switch circuit array 5 allows the optical signal processing device 10b that is connected to the second channel to be connected to the optical signal processing device 10a that is connected to the first channel with bypassing the signal processing portion 6. This enables the optical signal processing device 10b to transmit an optical signal to the optical signal processing device 10a.

(When Selecting Both of the Bypass Loops #1 and #2 at the Same Time)

Similar to a case where selecting any one of the Bypass Loops #1 and #2, the switch control portion 7 supplies the switch control signal, S1=00, to the switch circuit SW1 and the switch control signal, S2=00, to the switch circuit SW2. The switch control portion 7 also supplies the switch control signal, S3=1, to the switch circuit SW3 and the switch control signal, S4=1, to the switch circuit SW4. As a result thereof, when S3=1, the connection point a3 is connected to the connection point b3 so that the light-receiving element 3a can be connected to the light-emitting element 4b to connect its output to the light-emitting element 4b and when S4=1, the connection point a4 is connected to the connection point b4 so that the light-receiving element 3b can be connected to the light-emitting element 4a to connect its output to the light-emitting element 4a.

Such the control of the switch circuit array 5 allows an optical signal to be transmitted and/or received between the optical signal processing device 10a that is connected to the first channel and the optical signal processing device 10b that is connected to the second channel with bypassing the signal processing portion 6.

It is to be noted that if the switch circuit SW1 receives a switch control signal, S1=10 or S1=11, and the switch circuit SW2 receives a switch control signal, S1=10 or S1=11, when selecting the bypass loops, the optical signal that is transmitted and/or received between the optical signal processing device 10a and the optical signal processing device 10b can be monitored.

Thus, according to the optical signal processing device 10 as the first embodiment according to the invention, if processing an optical signal based on predetermined data, the switch circuit array 5 is connected to the port 1 for inputting and outputting of the optical communication, which is connected to the first fiber channels FC 11, FC 12 and/or the port 2 for inputting and outputting of the optical communication, which is connected to the second fiber channels FC 21, FC 22, thereby enabling the first fiber channels FC 11, FC 12 or the second fiber channels FC 21, FC 22 to be selected.

Therefore, any one of an optical signal processing device 10a which is connected to the first fiber channels FC 11, FC 12 and the other optical signal processing device 10b which is connected to the second fiber channels FC 21, FC 22 can be selected. Such the fiber channel selection function can be efficiently applied to the information recording/reproducing apparatus and the data storage device. It is also possible to decrease a number of parts relative to an input/output terminal for optical communication and an optical signal conversion element, as compared with a case where a single component exhibiting any switch function for optical communication is separately configured.

For example, in this embodiment, parts shared with the fiber channel hub and the fiber channel switch can be omitted so that four input/output terminals, two light-receiving elements and two light-emitting elements can be deleted as compared with a case where an external one having fiber switch function is added to the data recording/reproducing apparatus. Thus, the information recording/reproducing system such as AV server system can be configured at a low price.

Although it has been described in this first embodiment that the switch circuit array 5 is operated under the control of the switch control signals S1 to S4, this invention is not limited thereto. When a manual switch is provided, manual operation can be implemented in this embodiment. This causes similar excellent effects.

Figure 5:
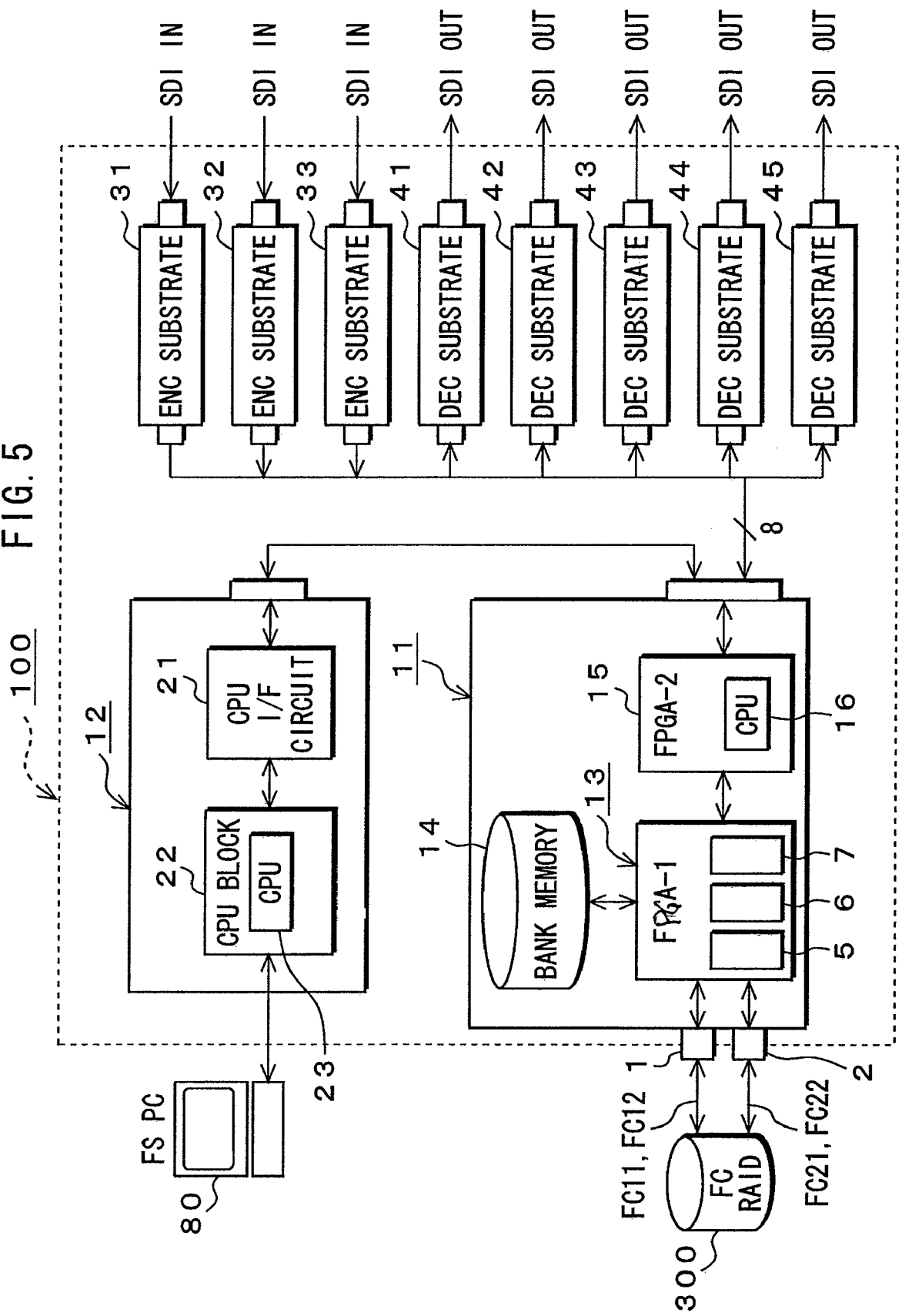
FIG. 5 is a block diagram for showing a configuration of data recording/reproducing apparatus as a second embodiment according to the invention in which in which the optical signal processing device is used.

FIG. 5 shows a configuration of the data recording/reproducing apparatus 100 as a second embodiment according to the invention in which the optical signal processing device 10 is used.

In this embodiment, the data recording/reproducing apparatus 100 has input/output channels such as two ports for fiber channels (optical communication lines) and any simple switch function for fiber channel. This data recording/reproducing apparatus 100 can connect another data recording/reproducing apparatus without using any fiber channel hub (HUB) or any fiber channel switch (FCS) relative to related art.

The data recording/reproducing apparatus 100 shown in FIG. 5 is an example of the information recording/reproducing apparatus and records and/or reproduces a data stream with a predetermined data format. The data recording/reproducing apparatus 100 is connected to a data storage device 300 and a file system personal computer (hereinafter referred to as "FS PC") 80, which is similar to the FM personal computer, and is used. The information recording/reproducing apparatus is also preferably applied to a personal computer (PC) server, a non-linear AV server, a non-linear editor or the like.

The data recording/reproducing apparatus 100 has a data recording/reproducing substrate 11, three encoder substrates (hereinafter referred to as "ENC substrates") 31 to 33, five decoder substrates (hereinafter referred to as "DEC substrates") 41 to 45, and a recording/reproducing control substrate 12.

The recording/reproducing control substrate 12 has a CPU interface (hereinafter referred to as "CPU I/F circuit") 21, and a CPU block 22. The CPU block has a main CPU 23. The main CPU 23 controls any circuits and/or memories mounted on the data recording/reproducing substrate 11. For example, the main CPU 23 acquires a writing region on the data storage device 300 from the FS PC 80 and allows for storing AV data stream in the data storage device 300 at a time when the AV data stream occupies an address area that is previously preserved in a memory mounted on the data recording/reproducing substrate 11.

Input/output (I/O) port, not shown, of the recording/reproducing control substrate 12 is connected to I/O port of the data recording/reproducing substrate 11. The data recording/reproducing substrate 11 is constituted of the optical signal processing device. The data recording/reproducing substrate 11 has a fiber channel interface circuit (hereinafter referred to as "FC-I/F circuit") 13, a bank memory 14, and an encoder and decoder interface circuit (hereinafter referred to as "ENC/DEC-I/F circuit") 15.

The FC-I/F circuit 13 is constituted of field programmable gate array (FPGA) and has an optical signal processing function and a simple switch function. For example, the FC-I/F circuit 13 has the switch circuit array 5, the signal processing portion 6, and the switch control portion 7.

The data recording/reproducing substrate 11 is equipped with the port 1 and the port 2 for inputting and/or outputting of the optical communication as described in the above first embodiment. The port 1 is connected to the first fiber channel FC 1 (FC 11 or FC 12). The port 2 is connected to the second fiber channel FC 2 (FC 21 or FC 22).

The ports 1 and 2 are connected to the switch circuit array 5 for optical communication as described in the first embodiment to select the first channel of fiber channel FC 1 or the second channel of fiber channel FC 2. The switch circuit array 5 is connected to the signal processing portion 6 to perform any signal processing thereon based on the data stream. For example, the signal processing portion 6 performs any controls of reading and/or writing the data stream to/from the bank memory 14 and performs any access controls to the data storage device (redundant arrays of inexpensive disks (RAID)) 300 through the fiber channel FC 1 or the fiber channel FC 2.

The FC-I/F circuit 13 is connected to the bank memory 14 to store AV data stream for each frame. For example, the AV data stream is written into any designated address area in the bank memory 14. Any information on the address area is added to (placed upon) the AV data stream. The AV data stream is transferred to an address area designated by the information. This allows the AV data stream to be buffered in the bank memory 14. As the bank memory, a hard desk or the like is used.

The FC-I/F circuit 13 is also connected to the ENC/DEC-I/F circuit 15, other than the bank memory 14, to perform any transmission and/or reception of the AV data stream to and/or from the I/O ports of the ENC substrates 31 to 33 and the DEC substrates 41 to 45. The ENC/DEC-I/F circuit 15 includes local sub CPU (Nios-trade mark) 16 constituted of FPGA to arbitrate destinations of the AV data streams that are transmitted from the plural ENC substrates 31 to 33 when recording the data.

For example, the CPU 16 receives from the main CPU 23 any information on the writing area of the AV data stream in the data storage device 300 and controls the signal processing portion 6 of the FC-I/F circuit 13 based on the information to write the AV data stream stored on the bank memory 14 into the data storage device 300.

The ENC/DEC-I/F circuit 15 is connected to each of the I/O ports, not shown, in the encoder (ENC) substrates 31 to 33 and the decoder (DEC) substrates 41 to 45. The ENC substrate 31 receives the audio and video signal SDI and codes and compresses it according to a predetermined compression standard for audio and video signal when recording the data. The compressed audio and video data becomes the AV data stream.

The ENC substrate 31 transmits the AV data stream to the data recording/reproducing substrate 11 at any time under the control of the main CPU 23 for every time when the bank memory 14 stores the AV data stream for each frame. In this moment, any information on which position in the bank memory 14 the AV data stream is transmitted to is added to (placed on) the AV data stream. The AV data stream is written in to the address area specified in the bank memory 14. Similarly, other ENC substrates 32 and 33 receive audio and video signal SDI and transmit the AV data stream.

The DEC substrate 41 receives the AV data stream from the bank memory 14 when reproducing the data, and decodes and de-compresses it according to a predetermined audio and video de-compression standard. De-compressed audio and video data becomes the audio and video signal SDI. Similarly, other DEC substrates 42 to 45 receive the AV data stream and transmit the audio and video signal SDI.

Figure 6:
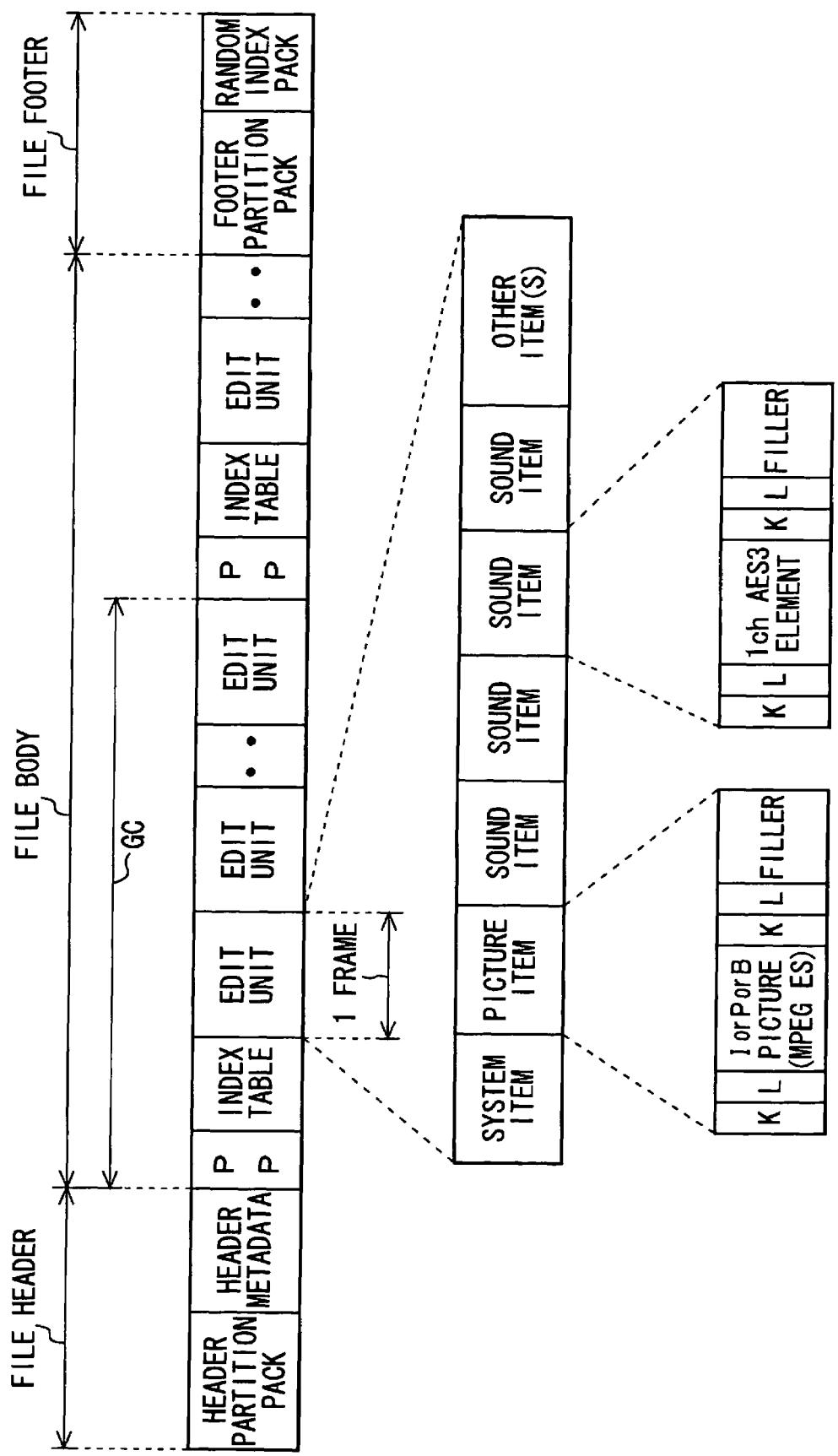
FIG. 6 is a diagram for showing an example of data structure in MXF file.

FIG. 6 shows a format example of a data structure in MXF file.

The data structure in MXF file shown in FIG. 6 is preferably applied to an AV multiple data format, which is used in an embodiment of the data recording/reproducing apparatus 100. In the data structure in MXF file, the AV data stream is constituted of a file header portion, a file body portion, and a file footer portion, which have a hierarchy structure.

The file body portion includes video data and audio data that are multiplex as the AV data, for example, in units of 60 frames (in a case of NTSC). This MXF file corresponds to any various recording formats without depending on a platform and corresponds to Quick Time (QT) (trade mark) that is scalable software.

The file header portion includes any necessary information for reproducing and/or editing the video data and audio data arranged in the file body portion according to the MXF standard using QT. In the file header portion, Run In, Header Partition Pack, and Header Metadata are arranged in turn as MXF header from a top thereof to an end thereof.

The Run In is an option for interpreting a start of the MXF header if a pattern by 11 bytes is met. The Run In can be saved up to 64 kilo bytes at a maximum but to 8 bytes in this embodiment. As Run In, any one other than the pattern by 11 bytes can be used in the MXF header.

The Header Partition Pack includes the pattern by 11 bytes that is used for identifying the file header portion, information indicating a form of data that is arranged in the file body portion and a file format thereof and the like. The Header Metadata includes any information that is necessary for reading the AV data arranged in the file body portion.

The file body portion is constituted of a generic container (GC) or an essence container (EC). The generic container includes a Partition Pack (PP), an Index Table, Edit Units. The Edit Units are arranged in unites of frame from a first frame to tenth frame.

The file footer portion includes a footer partition pack and a random index pack.

The Edit Unit of one frame includes the AV data that is multiplex, for example, in units of 60 frames (in a case of NTSC). The Edit Unit of one frame includes a System Item, a Picture Item, a Sound Item, and Auxiliary (Other) Item. The System Item describes a local time code (LTC), UMID, and Essence Mark.

The Sound Item includes, for example, four blocks. The Picture Item includes a key (K) and a data length (L) as well as I, P or B picture (MPEG ES) as a lower hierarch thereof, followed by K, L, and Filler. The Sound Item includes K and L as well as 1ch AES3 Element as a lower hierarch thereof, followed by K, L, and Filler.

The file footer portion includes Footer Partition Pack. The Footer Partition Pack includes data for identifying the file footer portion.

If giving the MXF file thus configured, the data recording/reproducing apparatus 100 based on the MXF standard first reads the pattern by 11 bytes in the Header Partition Pack to discover the MXF header. The data recording/reproducing apparatus 100 can read the AV data included in the GC based on the Header Metadata in the MXF header.

The following will describe operations of the data recording/reproducing apparatus 100. In this embodiment, the port 1 of the data recording/reproducing substrate 11 is connected to the data storage device (redundant arrays of inexpensive disks (RAID)) 300 via the first fiber channels FC 1 (FC 11 and FC 12) as well as the port 2 thereof is connected to the data storage device (RAID) 300 via the second fiber channel FC 2 (FC 21 and FC 22). The switch circuit array 5 connected to the ports 1 and 2 selects the first fiber channels FC 1 or the second fiber channels FC 2.

According to this, the following will describe operations of the data recording/reproducing apparatus 100 when recording the data and reproducing the data.

(Operation When Recording the Data)

The data recording/reproducing apparatus 100 performs any digital processing on an audio and video signal SDI received from, for example, a broadcast station or an image and audio source and produces AV data stream with a data structure of MXF file to sore it in the data storage device. In this case, the ENC substrates 31 to 33 receive the audio and video signals SDI and code and compress them according to a predetermined compression standard for audio and video signal. The compressed audio and video data becomes the AV data stream.

The ENC substrate 31 transmits the AV data streams to the data recording/reproducing substrate 11 at any time under the control of the main CPU 23 for every time when the bank memory 14 stores the AV data stream of one frame. In this moment, any information on which position in the bank memory 14 the AV data stream is transmitted to is added to (placed on) the AV data stream. The AV data stream is written into the address area specified in the bank memory 14. In this moment, the AV data stream with an MXF data format constituted of the file header, the file body, and the file footer, as shown in FIG. 6, is formed. Similarly, other ENC substrates 32 and 33 receive and process the audio and video signals SDI.

On the data recording/reproducing substrate 11, the signal processing portion 6 connected to the switch circuit array 5 controls writing and reading a data stream to and from the bank memory 14, and performs any access controls to the data storage device 300 via the first channels FC 1 or the second fiber channels FC 2. For example, in the ENC/DEC-I/F circuit 15, the sub CPU 16 arbitrates destinations of the AV data streams transmitted from the plural ENC substrates 31 to 33 when recording the data.

On the other hand, in the recording/reproducing control substrate 12, the main CPU 23 allows for acquiring any writing area on the data storage device 300 from the FS PC 80 and informs the sub CPU 16 to transmit (record) the AV data stream to (in) the data storage device 300 when the AV data stream occupies the previously reserved address area of the bank memory 14 mounted on the data recording/reproducing substrate 11.

The sub CPU 16 receives this information and controls the signal processing portion 6 of the FC-I/F circuit 13 based on the information on the writing area of the AV data stream in the data storage device 300 to write the AV data stream on the bank memory 14 into the data storage device 300.

(Operation When Reproducing the Data)

If reproducing the AV data stream from the data storage device (RAID) 300, the main CPU 23 of the recording/reproducing control substrate 12 acquires from FS PC 80 any information on the address area of the data storage device 300 on which the AV data stream has stored. The main CPU 23 also assigns to the memory bank 14 any data storage regions therein (information on address area thereto) to hold the AV data stream read out of the data storage device 300.

The sub CPU 16 of the data recording/reproducing substrate 11 receives the information on address area and controls the FC-I/F circuit 13 to read the AV data stream out of the data storage device 300 and transmit it to the bank memory 14. The bank memory 14 stores the AV data stream for each frame when reproducing the data.

The main CPU 23 transmits to the sub CPU 16 a command of transferring the AV data stream to the DEC substrates 41 to 45. The sub CPU 16 receives the command of transferring the AV data stream from the main CPU 23 and specifies he address on the bank memory 14, a length of data, a number of DEC substrate for which the AV data stream is destined, and a bank number on the DEC substrate to carry out any transfer control of the AV data stream.

In this case, the bank number on the DEC substrate is added to (placed on) the AV data stream. The ENC/DEC-I/F circuit 15 distributes the AV data stream to transmit it to the bank memory on the DEC substrate. For example, the DEC substrate 41 receives the AV data stream from the bank memory 14 when reproducing the data and decodes and de-compresses it based on a predetermined de-compression standard for audio and video data. The de-compressed audio and video data becomes the audio and video data SDI.

Figure 7:
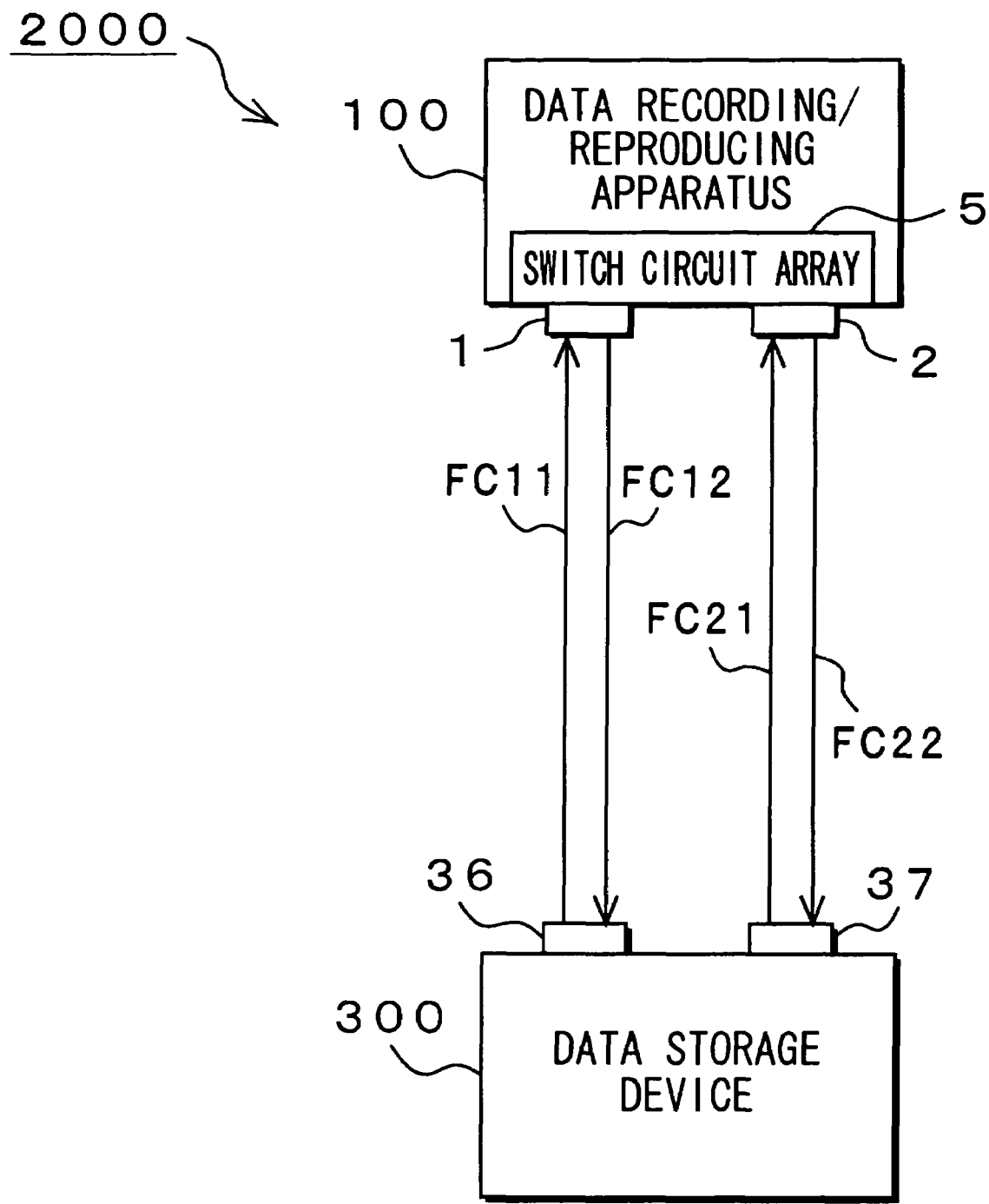
FIG. 7 is a block diagram for showing a configuration of a system in which the data recording/reproducing apparatus is used.

FIG. 7 shows a configuration of a system 2000 to which an embodiment of the data recording/reproducing apparatus 100 is applied. In the system 2000 shown in FIG. 7, a one-originator to one-responder scheme is utilized.

An embodiment of the optical signal processing device 10 according to the invention, which implements a simple switch function, is applied to this embodiment of the system 2000. The system 2000 implements any fail over function such that fiber channels (optical communication lines) can be doubly connected and if any optical communication lines are troubled, any automatic switching can be carried out.

In this embodiment, the data recording/reproducing apparatus 100 has a switch circuit array 5. The port 1 of the switch circuit array 5 is connected to the first fiber channels FC 11, FC 12. The port 2 thereof is connected to the second fiber channels FC 21, FC 22.

The data storage device 300 doubly connected to the data recording/reproducing apparatus 100 has a first port 36 and a second port 37 each for inputting and outputting for optical communication. The port 36 is connected to the first fiber channels FC 11, FC 12. The port 37 is connected to the second fiber channels FC 21, FC 22. Each of the ports 36, 37 has a switch circuit array 5, a signal processing portion 6, and a switch control portion 7, as shown in FIG. 4, in the data storage device 300 to unify the input and output thereof into one system.

The data storage device 300 has a data storing portion, not shown, and an optical signal processing portion, not shown. The data storing portion stores a data stream with a predetermined data format such as MXF file. The optical signal processing portion processes an optical signal based on the data stream. For example, the optical signal processing portion modulates laser light radiated from a light-emitting element, not shown, based on the data stream and de-modulates the data stream from the optical signal that is received by a light-receiving element, not shown, and photoelectric converted. As the data storage device 300, a just a bunch of disks (JBOD), a fiber channel semiconductor storage device or the like other than redundant arrays of inexpensive disks (RAID) can be used.

Next, the following will describe an example of operations of the system 2000 in which the one-originator to one-responder scheme is utilized.

For example, if selecting the first channel, the switch control portion 7 shown in FIG. 4 supplies a switch control signal, S1=10, to the switch circuit SW1 and a switch control signal, S2=10, to the switch circuit SW2. In this moment, the switch circuits SW3, SW4 are kept OFF. As a result thereof, when S1=10, the connection point a1 is connected to the neutral point c1 so that the light-receiving element 3a can be selected and driven. When S2=10, the connection point a2 is connected to the neutral point c2 so that the light-emitting element 4a can be selected and driven.

Such the control of the switch circuit array 5 allows the first fiber channels FC 11, FC 12 to be selected between the data recording/reproducing apparatus 100 and the data storage device 300. This enables an optical signal to be transmitted and/or received between the data recording/reproducing apparatus 100 and the data storage device 300 using the first fiber channels FC 11, FC 12.

If selecting the second channel, the switch control portion 7 supplies a switch control signal, S1=11, to the switch circuit SW1 and a switch control signal, S2=11, to the switch circuit SW2. In this moment, the switch circuits SW3, SW4 are kept OFF. As a result thereof, when S1=11, the connection point b1 is connected to the neutral point c1 so that the light-receiving element 3b can be selected and driven. When S2=11, the connection point b2 is connected to the neutral point c2 so that the light-emitting element 4b can be selected and driven.

Such the control of the switch circuit array 5 allows the second fiber channels FC 21, FC 22 to be selected between the data recording/reproducing apparatus 100 and the data storage device 300. This enables an optical signal to be transmitted and/or received between the data recording/reproducing apparatus 100 and the data storage device 300 using the second fiber channels FC 21, FC 22.

Thus, to the data recording/reproducing apparatus 100 as a second embodiment according to the invention, the embodiment of the optical signal processing device according to the invention that has a simple switching function is applied wherein the port 1 thereof is connected to the first port 36 of the data storage device 300 via the first fiber channels FC 11, FC 12 and the port 2 thereof is connected to the second port 37 of the data storage device 300 via the second fiber channels FC 21, FC 22.

Thus, it is possible to select anyone of the first fiber channels FC 11, FC 12 and the second fiber channels FC 21, FC 22 by which the data recording/reproducing apparatus 100 and the data storage device 300 are doubly connected without depending on any external fiber channel hub and any fiber channel switch. This allows a point-to point topology connection to the one data storage device 300 to be doubled to implement a fail over function thereof.

Figure 8:
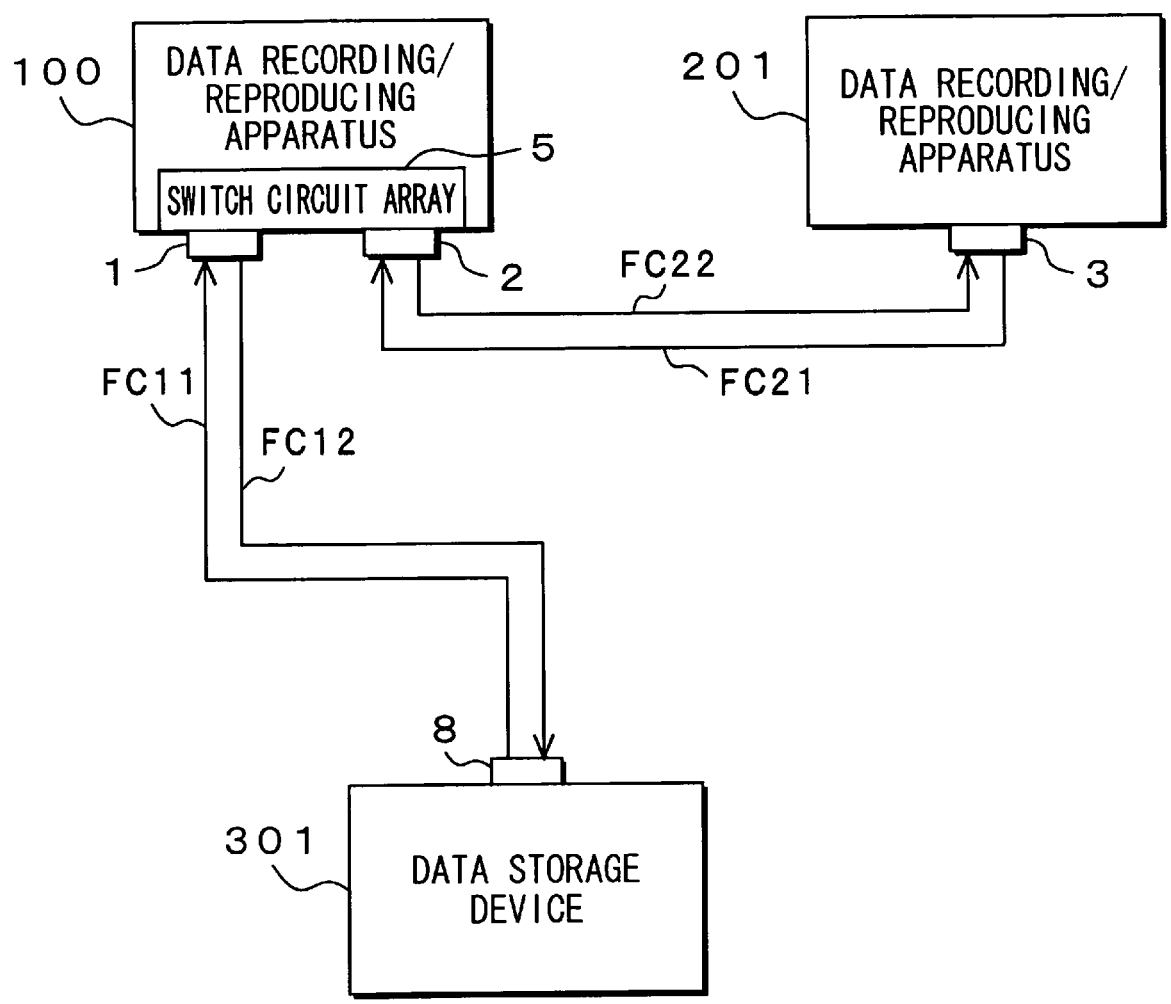
FIG. 8 is a block diagram for showing a system to which a third embodiment of the data recording/reproducing apparatus is applied.

FIG. 8 shows a configuration of a system 3000 to which the data recording/reproducing apparatus 100 as a third embodiment of this invention is applied.

In this embodiment of system 3000, the data recording/reproducing apparatus 100 has two ports for input and output for the fiber channel and a simple switching function for the fiber channel, thereby allowing the two data recording/reproducing apparatuses 100, 201 to be connected to the one data storage device 301 by a fabric topology connection that has a relatively simple protocol without adding any fiber channel hub and any fiber channel switch.

In the system 3000 shown in FIG. 8, a two-originator to one-responder scheme is utilized. In this embodiment, the data recording/reproducing apparatus 100 has a switch circuit array 5. The port 1 of the switch circuit array 5 is connected to the first fiber channels FC 11, FC 12. The port 2 thereof is connected to the second fiber channels FC 21, FC 22.

The switch circuit array 5 selects any of the data storage device 301 connected to the port 1 and another data recording/reproducing apparatus 201 connected to the port 2. The data recording/reproducing apparatus 201 has a port 3 which is connected to the second fiber channels FC 21, FC 22. As the data storage device 301, the just a bunch of disks (JBOD), a fiber channel semiconductor storage device or the like other than redundant arrays of inexpensive disks (RAID) that has input and output terminals for fiber channel can be used.

In this embodiment, the data storage device 301 has a port 8 for inputting and outputting for optical communication which is connected to the first fiber channels FC 11, FC 12. The data storage device 301 also has a data storing portion, not shown, and an optical signal processing portion, not shown, which is similar to the data storage device 300 described in the embodiment shown in FIG. 7. The data storing portion stores data stream with a predetermined data format such as MXF file. The optical signal processing portion processes an optical signal based on the data stream.

Thus, in the embodiment of the system 3000 to which the data recording/reproducing apparatus 100 as a third embodiment of this invention is applied, the port 1 of the data recording/reproducing apparatus 100 is connected to the data storage device 301 via the first fiber channels FC 11, FC 12. The port 2 thereof is connected to another data recording/reproducing apparatus 201 via the second fiber channels FC 21, FC 22. In the data recording/reproducing apparatus 100, the switch circuit array 5 is controlled as described in the above first embodiment.

For example, if selecting the first fiber channels FC 11, FC 12, the switch control portion 7 shown in FIG. 4 supplies a switch control signal, S1=10, to the switch circuit SW1 and a switch control signal, S2=10, to the switch circuit SW2. In this moment, the switch circuits SW3, SW4 are kept OFF. As a result thereof, when S1=10, the connection point a1 is connected to the neutral point c1 so that the light-receiving element 3a can be selected and driven. When S2=10, the connection point a2 is connected to the neutral point c2 so that the light-emitting element 4a can be selected and driven.

Such the control of the switch circuit array 5 allows the data storage device 301 connected to the first channel to be selected. This enables the data recording/reproducing apparatus 100 to transmit and/or receive an optical signal to and/or from the data storage device 301.

If selecting the second fiber channels FC 21, FC 22, and the data recording/reproducing apparatus 201 accesses the data storage device 301, the switch control portion 7 supplies a switch control signal, S1=00, to the switch circuit SW1 and a switch control signal, S2=00, to the switch circuit SW2. The switch control portion 7 also supplies a switch control signal, S3=1, to the switch circuit SW3 and a switch control signal, S4=1, to the switch circuit SW4. As a result thereof, when S3=1, the connection point a3 is connected to the connection point b3 so that the light-receiving element 3a can be connected to the light-emitting element 4b to connect the output of the light-receiving element 3a to the light-emitting element 4b as well as when S4=1, the connection point a4 is connected to the connection point b4 so that the light-receiving element 3b can be connected to the light-emitting element 4a to connect the output of the light-receiving element 3b to the light-emitting element 4a.

Such the control of the switch circuit array 5 allows an optical signal to be transmitted and/or received between the data storage device 301 connected to the first channel and the data recording/reproducing apparatus 201 connected to the second channel with bypassing the data recording/reproducing apparatus 100. Thus, it is possible for each of the two data recording/reproducing apparatuses 100, 201 to access the data storage device 301 without using any external fiber channel hub 602 and the like, without being subject to any influence of failure and shut-down in power of any one of the data recording/reproducing apparatuses 100, 201, which is a weak point of the arbitrated loop topology connection, and without any arbiter operations in access.

Figure 9:
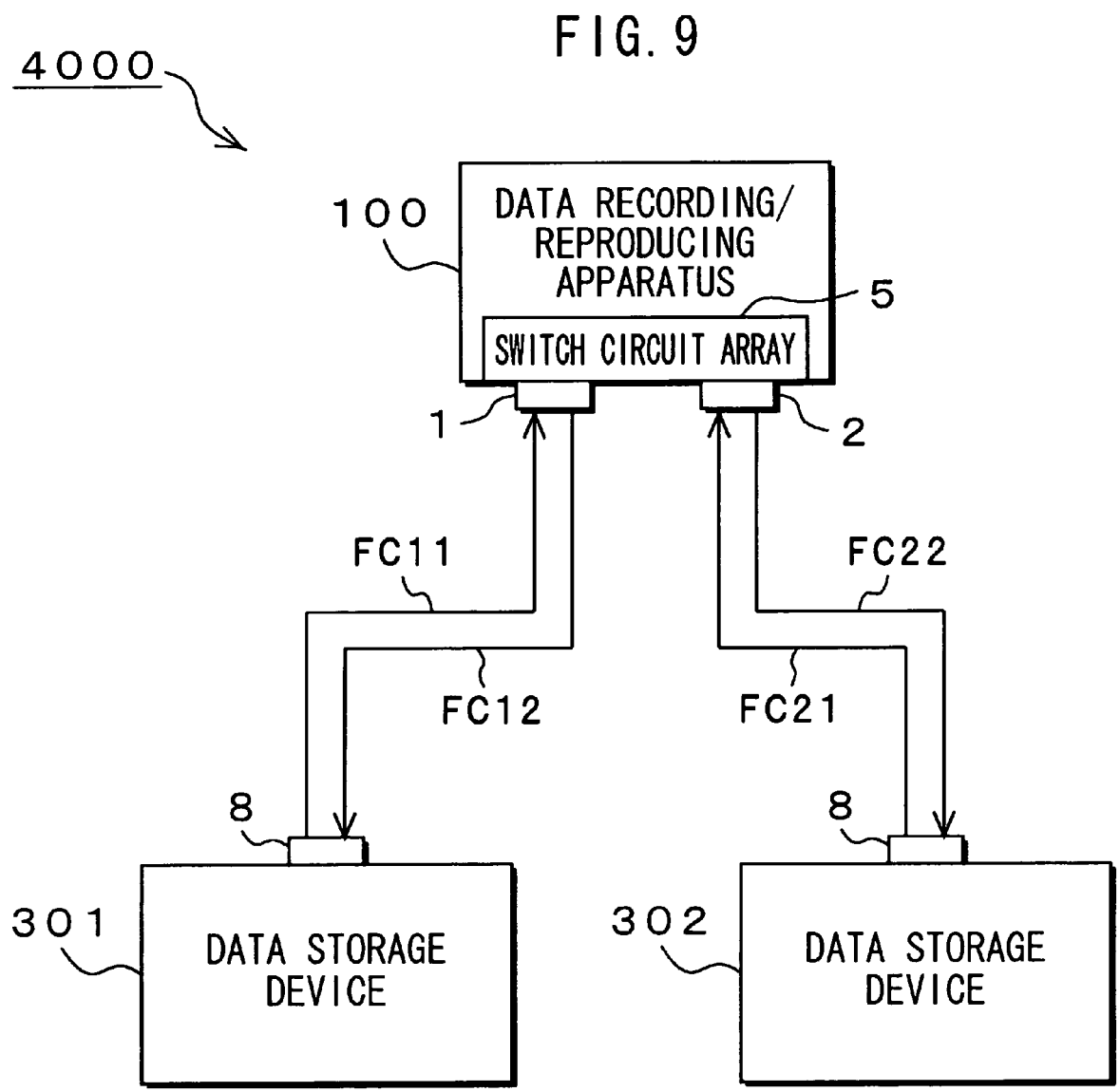
FIG. 9 is a block diagram for showing a system to which a fourth embodiment of the data recording/reproducing apparatus is applied.

FIG. 9 shows a configuration of a system 4000 to which the data recording/reproducing apparatus 100 as a fourth embodiment of this invention is applied.

In this embodiment of system 4000 as shown in FIG. 9, a one-originator to two-responder scheme is utilized. In this embodiment, the data recording/reproducing apparatus 100 has a switch circuit array 5. The port 1 of the switch circuit array 5 is connected to the first fiber channels FC 11, FC 12. The port 2 thereof is connected to the second fiber channels FC 21, FC 22. The switch circuit array 5 selects any of the first data storage device 301 connected to the port 1 and a second data storage device 302 connected to the port 2.

The first data storage device 301 has a port 8 for inputting and outputting for optical communication which is connected to the first fiber channels FC 11, FC 12. The second data storage device 302 has a port 8 for inputting and out putting for optical communication which is connected to the second fiber channels FC 21, FC 22. The second data storage device 302 has same function as that of the data storage device 301 as described in the third embodiment, a detailed explanation of which will be omitted.

Thus, in the embodiment of the system 4000 to which the data recording/reproducing apparatus 100 as a fourth embodiment according to this invention is applied, the port 1 of the data recording/reproducing apparatus 100 is connected to the first data storage device 301 via the first fiber channels FC 12, FC 12. The port 2 thereof is connected to the second data storage device 302 via the second fiber channels FC 21, FC 22. In the data recording/reproducing apparatus 100, the switch circuit array 5 is controlled as described in the above first embodiment.

For example, if selecting the first fiber channels FC 11, FC 12, the switch control portion 7 shown in FIG. 4 supplies a switch control signal, S1=10, to the switch circuit SW1 and a switch control signal, S2=10, to the switch circuit SW2. In this moment, the switch circuits SW3, SW4 are kept OFF. As a result thereof, when S1=10, the connection point a1 is connected to the neutral point c1 so that the light-receiving element 3a can be selected and driven. When S2=10, the connection point a2 is connected to the neutral point c2 so that the light-emitting element 4a can be selected and driven.

Such the control of the switch circuit array 5 allows the first data storage device 301 connected to the first channel to be selected. This enables the data recording/reproducing apparatus 100 to transmit and/or receive an optical signal to and/or from the first data storage device 301.

If selecting the second fiber channels FC 21, FC 22, the switch control portion 7 supplies a switch control signal, S1=11, to the switch circuit SW1 and a switch control signal, S2=11, to the switch circuit SW2. In this moment, the switch circuits SW3, SW4 are kept OFF. As a result thereof, when S1=11, the connection point b1 is connected to the neutral point c1 so that the light-receiving element 3b can be selected and driven. When S2=11, the connection point b2 is connected to the neutral point c2 so that the light-emitting element 4b can be selected and driven.

Such the control of the switch circuit array 5 allows the second data storage device 302 connected to the second channel to be selected. This enables the data recording/reproducing apparatus 100 to transmit and/or receive an optical signal to and/or from the second data storage device 302. Therefore, it is possible to constitute a point-to-point topology connection between the data recording/reproducing apparatus 100 and each of the two data storage devices 301, 302.

Figure 10:
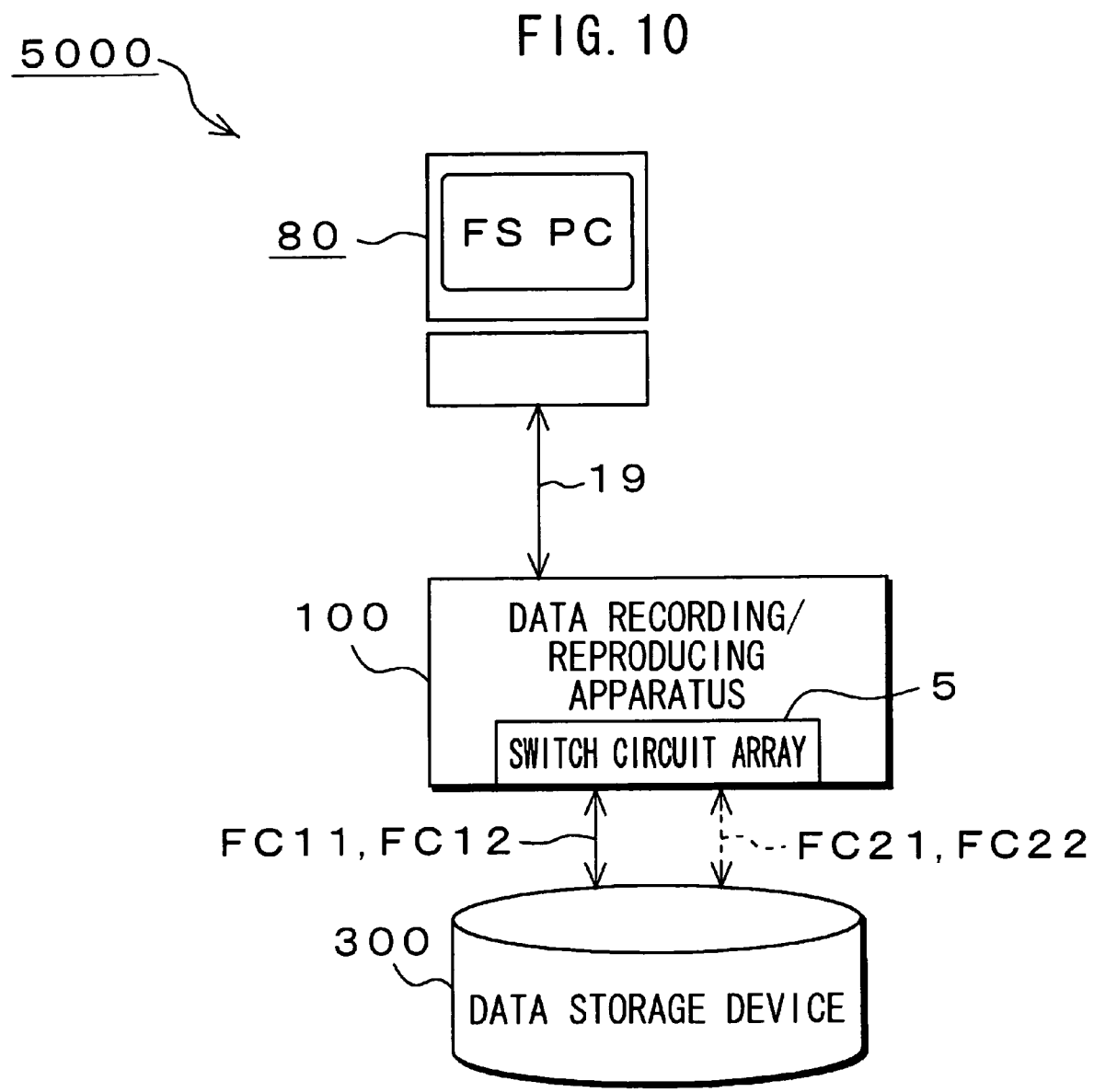
FIG. 10 is a block diagram for showing a data recording/reproducing system as a fifth embodiment of the invention.

FIG. 10 shows a configuration of a system 5000 as a fifth embodiment of this invention to which the data recording/reproducing apparatus 100 and the FS PC 80 are applied.

In this embodiment of system 5000, the system configuration of the second embodiment is expanded so that the data recording/reproducing apparatus 100 is connected to the FS PC 80 to carry out 1FC mode. The 1FC mode refers to a selection operation of any one of the first fiber channels FC 11, FC 12 and the second fiber channels FC 21, FC 22, which are prepared.

According to the 1FC mode, there is no network interface in the system 5000. In this embodiment, any one of the first fiber channels FC 11, FC 12 and the second fiber channels FC 21, FC 22 is illustratively used as a preparation system for the data storage device 300.

In FIG. 10, the system 5000 has one FS PC 80, one data recording/reproducing apparatus (IO BOX) 100, and one data storage device (fiber channel RAID (FC RAID)) 300. The FS PC 80 is connected to the data recording/reproducing apparatus 100 via a local area network (LAN) such as ETHERNET (trade mark) 19. The FS PC 80 manages the selection of the first fiber channels FC 11, FC 12 or the second fiber channels FC 21, FC 22 and transmits a control command for such the selection to the data recording/reproducing apparatus 100. If any fiber channel being in operation is troubled, the FS PC 80 transmits the selection control command to the data recording/reproducing apparatus 100.

The following will describe an example of selection control when any trouble occurs in the system 5000. It is estimated the if selecting the first fiber channels FC 11, FC 12 to transmit and/or receive an optional signal between the data recording/reproducing apparatus 100 and the data storage device 300 and any first fiber channels are troubled, the first fiber channels FC 11, FC 12 are separated from the system and the second fiber channels are selected and connected to the system.

In this case, the switch control portion 7 shown in FIG. 4 changes a switch control signal from S1=10 to S1=11, to supply it to the switch circuit SW1 and changes a switch control signal from S2=10 to S2=11, to supply it to the switch circuit SW2. In this moment, the switch circuits SW3, SW4 are kept OFF. As a result thereof, when changing from S1=10 to S1=11, the connection point b1 instead of the connection point a1 is connected to the neutral point c1 so that the light-receiving element 3b instead of the light-receiving element 3a can be selected and driven. When changing from S2=10 to S2=11, the connection point b2 instead of the connection point a2 is connected to the neutral point c2 so that the light-emitting element 4b instead of the light-emitting element 4a can be selected and driven.

Such the control of the switch circuit array 5 allows the connection between the data recording/reproducing apparatus 100 and the data storage device 300 via the first fiber channels FC 11, FC 12 to be changed to the connection between the data recording/reproducing apparatus 100 and the data storage device 300 via the second fiber channels FC 21, FC 22. Thereafter, the first fiber channels FC 11, FC 12 that have been troubled are separated from the system so that any optical signal transmission and/or reception processing can be continuously performed between the data recording/reproducing apparatus 100 and the data storage device 300 via the second channel of fiber channels FC 21, FC 22 that is not troubled.

Thus, according to the system 5000 as the fifth embodiment of this invention, if the data recording/reproducing apparatus 100 transmits and/or receives the optical signal to and/or from the data storage device 300 using any one of the first fiber channels FC 11, FC 12 and the second fiber channels FC 21, FC 22 when the fiber channel being in operation at a present time is troubled, its port can be automatically changed from the troubled fiber cannel to the fiber channel that is not troubled, based on the selection control command from the FS PC 80, thereby allowing any optical signal transmission and/or reception processing to be continuously performed between the data recording/reproducing apparatus 100 and the data storage device 300.

Figure 11:
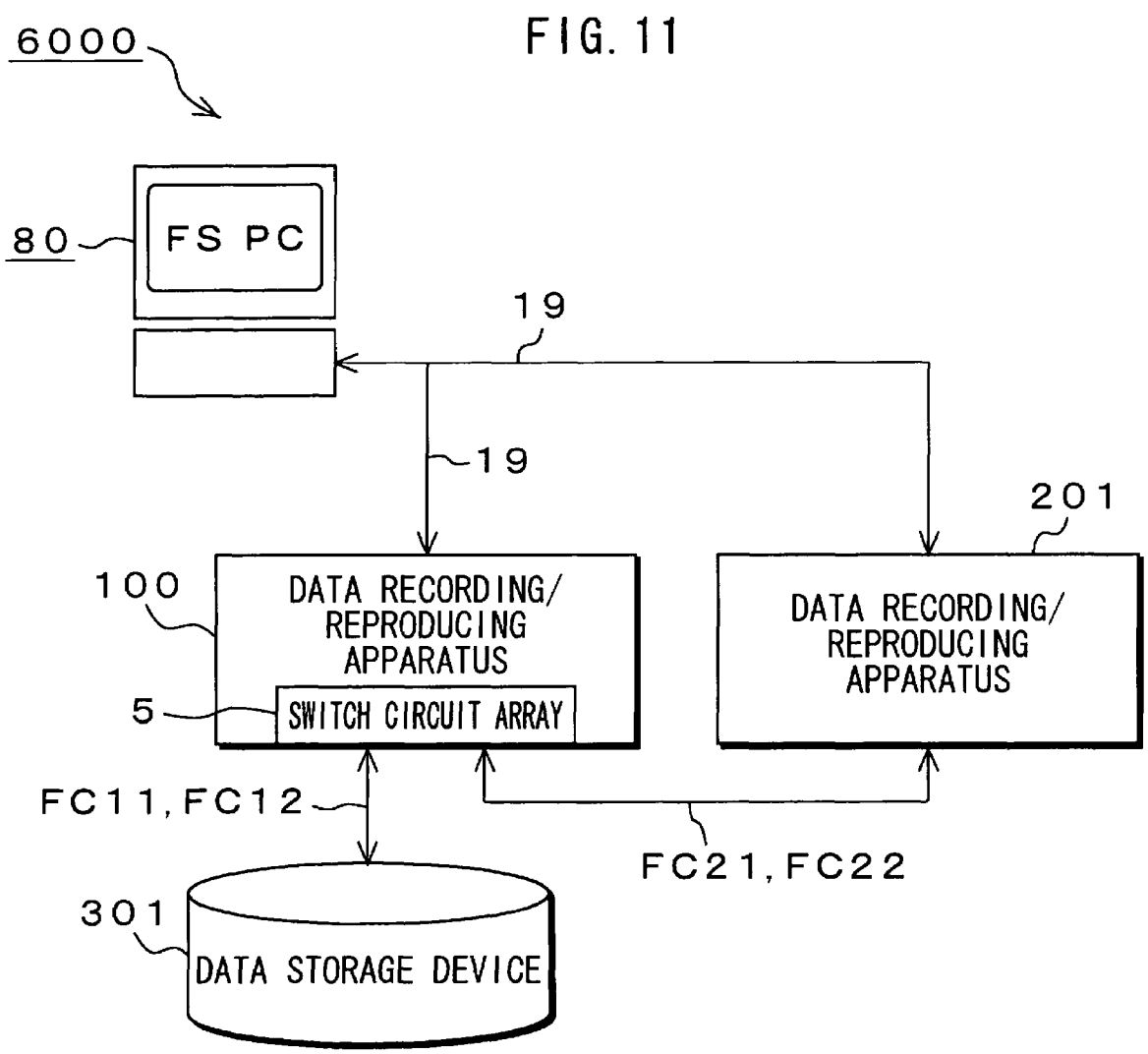
FIG. 11 is a block diagram for showing a data recording/reproducing system as a sixth embodiment of the invention.

FIG. 11 shows a configuration of a system 6000 as a sixth embodiment of this invention to which the data recording/reproducing apparatuses 100, 201 and the FS PC 80 are applied.

In this embodiment of system 6000, the system configuration of the third embodiment is expanded so that two data recording/reproducing apparatuses 100, 201 are connected to the FS PC 80 to carry out a first switch (SW) mode. The first SW mode refers to an operation to select any one of the data recording/reproducing apparatuses 100, 201, which are prepared, to perform an optical signal transmission and/or reception processing between the selected one and the data storage device 301.

According to the first SW mode, there is no network interface in the system 6000. In this embodiment, the data storage device 301 is shared with the two data recording/reproducing apparatuses 100, 201.

In FIG. 11, the system 6000 has one FS PC 80, two data recording/reproducing apparatuses (IO BOX) 100, 201, and one data storage device (FC RAID) 301. The FS PC 80 is connected to each of the data recording/reproducing apparatuses 100, 201 via a local area network (LAN) such as ETHERNET (trade mark) 19. The FS PC 80 manages the selection of the first fiber channels FC 11, FC 12 or the second fiber channels FC 21, FC 22 and transmits a control command for such the selection to the data recording/reproducing apparatus 100. If the data storage device 301 is shared with the two data recording/reproducing apparatuses 100, 201, the FS PC 80 transmits the selection control command to the data recording/reproducing apparatus 100.

The following will describe an example of selection control when the data storage device 301 is shared in the system 6000. It is estimated that if selecting the first fiber channels FC 11, FC 12 to transmit and/or receive an optional signal between the data recording/reproducing apparatus 100 and the data storage device 301 when the data recording/reproducing apparatus 201 connected to the second channel transmits an interrupt to the data storage device 301 connected to the first channel, the data recording/reproducing apparatus 100 is separated from the first fiber channels and the data recording/reproducing apparatus 201 connected to the second fiber channels is connected thereto.

In this case, the switch control portion 7 shown in FIG. 4 changes a switch control signal from S1=10 to S1=00, to supply it to the switch circuit SW1 and changes a switch control signal from S2=10 to S2=00, to supply it to the switch circuit SW2. The switch control portion 7 also supplies a switch control signal, S3=1, to the switch circuit SW3 and a switch control signal, S4=1, to the switch circuit SW4. As a result thereof, when S3=1, the connection point a3 is connected to the connection point b3 so that the light-receiving element 3a can be connected to the light-emitting element 4b to connect its output to the light-emitting element 4b. When S4=1, the connection point a4 is connected to the connection point b4 so that the light-receiving element 3b can be connected to the light-emitting element 4a to connect its output to the light-emitting element 4a.

Such the control of the switch circuit array 5 allows the optical signal transmission and/or reception processing to be performed between the data storage device 301 connected to the first channel and the data recording/reproducing apparatus 201 connected to the second channel with bypassing the data storage recording/reproducing apparatus 100. Thus, it is possible to assign a data processing right from the data recording/reproducing apparatus 100 that is in operation at present time, to the data recording/reproducing apparatus 201 to access the data storage device 301 without using any external fiber channel switch, without being subject to any influence of failure and shut-down in power of the data recording/reproducing apparatus 100, which is a weak point of the arbitrated loop topology connection, and without any arbiter operations in access.

Thus, according to the system 6000 as the sixth embodiment of this invention, if the data recording/reproducing apparatus 100 transmits and/or receives the optical signal to and/or from the data storage device 300 using the first fiber channels FC 11, FC 12 when an interrupt form the data recording/reproducing apparatus 201 occurs, its port can be automatically changed from the data recording/reproducing apparatus 100 that is in operation at the present time to the data recording/reproducing apparatus 201 based on the selection control command from the FS PC 80, thereby allowing any interruption processing on transmission and/or reception of the optical signal to be performed between the data recording/reproducing apparatus 201 and the data storage device 301.

Figure 12:
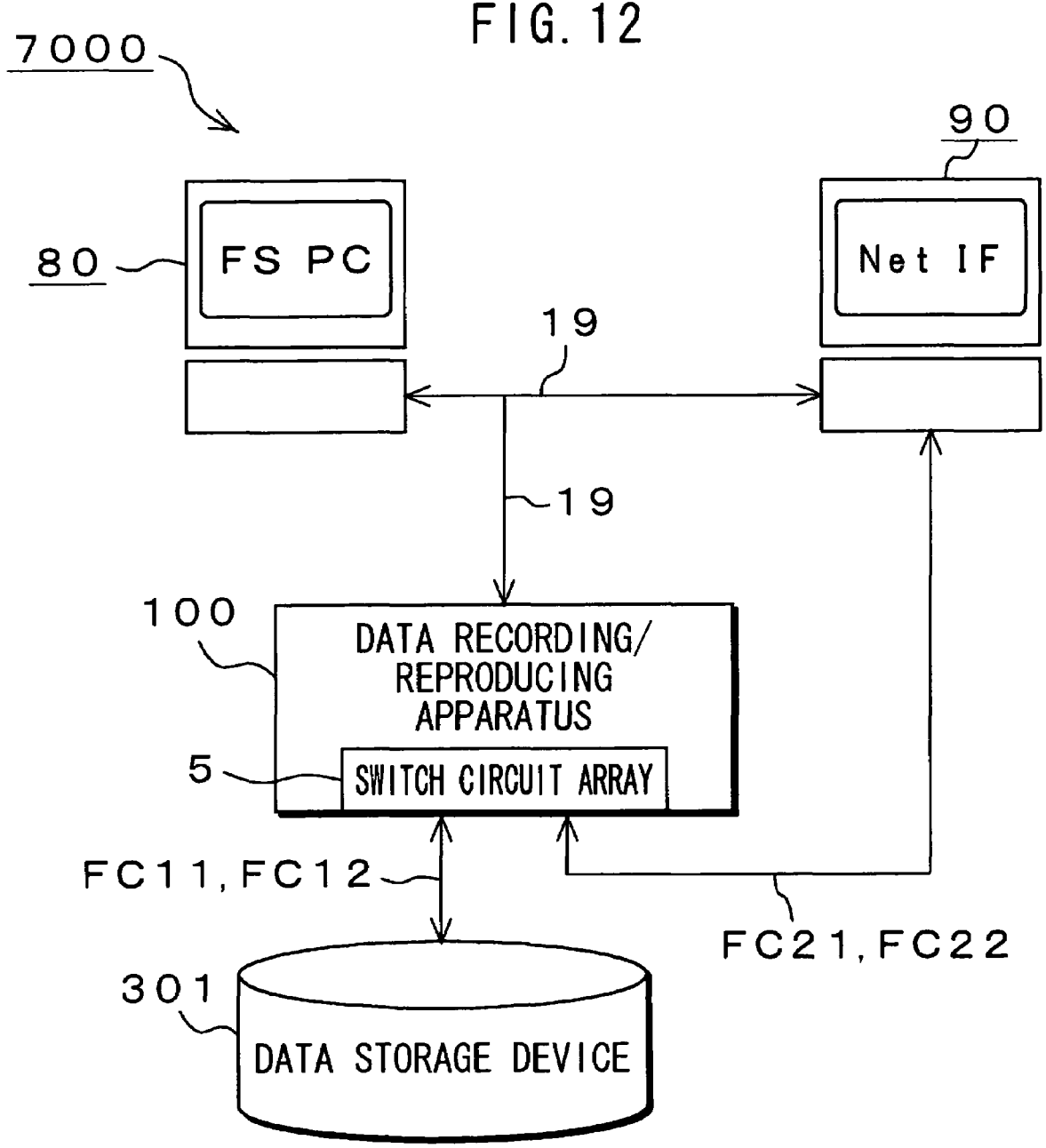
FIG. 12 is a block diagram for showing a data recording/reproducing system as a seventh embodiment of the invention.

FIG. 12 shows a configuration of a system 7000 as a seventh embodiment of this invention to which the data recording/reproducing apparatus 100, the FS PC 80, and the network interface (Net I/F) personal computer (hereinafter refereed to as "Net I/F personal computer") 90 are applied.

In this embodiment of system 7000, the system configuration of the third embodiment is expanded so that one data recording/reproducing apparatus (IO BOX) 100 is connected to the FS PC 80 and the Net I/F personal computer 90 to carry out a second switch (SW) mode. The second SW mode refers to an operation for the data recording/reproducing apparatus 100 to select any one of the data storage device 301 and the Net I/F personal computer 90 to perform an optical signal transmission and/or reception processing. In this embodiment, the data storage device 301 is shared with the data recording/reproducing apparatus 100 and the Net I/F personal computer 90.

The data recording/reproducing system 7000 as shown in FIG. 12 has one FS PC 80, the Net I/F personal computer 90, one data recording/reproducing apparatus (IO BOX) 100, and one data storage device (FC RAID) 301. The FS PC 80, the Net I/F personal computer 90, and the data recording/reproducing apparatus 100 are connected to each other via a local area network (LAN) such as ETHERNET (trade mark) 19.

The FS PC 80 manages the selection of the first fiber channels FC 11, FC 12 or the second fiber channels FC 21, FC 22 in the data recording/reproducing apparatus 100 and transmits a control command for such the selection to the data recording/reproducing apparatus 100. If the data recording/reproducing apparatuses 100 performs any packing processing on the data output from the Net I/F personal computer 90 or transmits a data stream with a general-purpose data format from the Net I/F personal computer 90 directly to the data storage device 301, the FS PC 80 transmits the selection control command to the data recording/reproducing apparatus 100.

The following will describe an example of transmitting a data stream from the Net I/F personal computer 90 to the data storage device 301 in the system 7000. For example, if selecting the first fiber channels FC 11, FC 12 to transmit and/or receive an optional signal between the data recording/reproducing apparatus 100 and the data storage device 301 when the data recording/reproducing apparatus 100 performs any packing processing on the data output from the Net I/F personal computer 90, the switch control portion 7 shown in FIG. 4 changes a switch control signal from S1=10 to S1=11, to supply it to the switch circuit SW1 and changes a switch control signal from S2=10 to S2=11, to supply it to the switch circuit SW2. In this moment, the switch circuits SW3, SW4 are kept OFF.

Such the control of the switch circuit array 5 allows the data recording/reproducing apparatus 100 to separate the data storage device 301 therefrom and to transmit and/or receive an optical signal to and/or from the Net I/F personal computer 90 connected to the second channel. This enables the data storage recording/reproducing apparatus 100 to perform the packing processing on the data output from the Net I/F personal computer 90 to produce the data stream with a predetermined data format.

Next, it is estimated that if the data storage device 301 connected to the first channel receives a request to record the data from the Net I/F personal computer 90 connected to the second channel, the data recording/reproducing apparatus 100 is separated from the first fiber channels FC 11, FC 12 and the Net I/F personal computer 90 connected to the second fiber channels FC 21, FC 22 is connected thereto.

In this case, the switch control portion 7 shown in FIG. 4 changes a switch control signal from S1=10 to S1=00, to supply it to the switch circuit SW1 and changes a switch control signal from S2=10 to S2=00, to supply it to the switch circuit SW2. The switch control portion 7 also supplies a switch control signal, S3=1, to the switch circuit SW3 and a switch control signal, S4=1, to the switch circuit SW4. As A result thereof, when S3=, the connection point a3 is connected to the connection point b3 so that the light-receiving element 3a can be connected to the light-emitting element 4b to connect its output to the light-emitting element 4b. When S4=1, the connection point a4 is connected to the connection point b4 so that the light-receiving element 3b can be connected to the light-emitting element 4a to connect its output to the light-emitting element 4a.

Such the control of the switch circuit array 5 allows the optical signal transmission and/or reception processing to be performed between the data storage device 301 connected to the first channel and the Net I/F personal computer 90 connected to the second channel with bypassing the data storage recording/reproducing apparatus 100. Thus, it is also possible to assign a data processing right from the data recording/reproducing apparatus 100 that is in operation at present time, to the Net I/F personal computer 90 to access the data storage device 301 without any arbiter operations in access. This allows a data stream with a general-purpose data format from the Net I/F personal computer 90 to be directly written to the data storage device 301.

Thus, according to the system 7000 as the seventh embodiment of this invention, the embodiment of the data recording/reproducing apparatus 100 is applied thereto so that any one of the data storage device 301 connected to the first fiber channels FC 11, FC 12 and the Net I/F personal computer 90 connected to the second fiber channels FC 21, FC 22 can be selected.

If the data recording/reproducing apparatus 100 transmits and/or receives an optical signal to and/or to the data storage device 301 using the first fiber channels FC 11, FC 12 when the data recording/reproducing apparatus 100 receives a request for recording the data from the Net I/F personal computer 90, its port can be automatically changed from the data recording/reproducing apparatus 100 that is in operation at the present time to the Net I/F personal computer 90 based on the selection control command from the FS PC 80, thereby allowing the Net I/F personal computer 90 to write the optical signal in the data storage device 301.

Further, it is also possible to decrease a number of parts relative to an input/output terminal for optical communication and an optical signal conversion element, as compared with a case where a single component such as the fiber channel hub 601 and the fiber channel switch 602 exhibiting any switch function for optical communication is separately configured. Thus, the AV server system or the like to which the embodiment of the above data recording/reproducing apparatus 100 according to the invention is applied can be configured at a low price.

The embodiments of the invention are preferably applied to an AV server system or the like that record and/or reproduces the AV data stream to/from the data storage device(s) via fiber channels.

It should be understood by those skilled in the art that various modifications, combinations, sub-combinations and alternations may occur depending on design requirements and other factors insofar as they are within the scope of the appended claims or the equivalents thereof.

What is claimed is:

1. An information recording/reproducing apparatus comprising:
a recording/reproducing device that performs either recording or reproducing a data stream with a predetermined data format;
an optical signal processing device that processes an optical signal based on the data stream,
wherein the optical signal processing device includes:
a first terminal that inputs and outputs the optical signal, said terminal being connected to a first channel of an associated optical communication line;
a second terminal that inputs and outputs the optical signal, said terminal being connected to a second channel of the associated optical communication line;
an optical signal processing portion that processes the optical signal; and
a switch portion for optical communication that selects a specific connection state from different connection states according to different switch connections, said switch portion being connected to the first and second terminals and the optical signal processing portion,
wherein the different connection states include:
a first connection state for transmitting the optical signal via the first terminal by selecting the first terminal;
a second connection state for transmitting the optical signal via the second terminal by selecting the second terminal; and
a third connection state for transmitting the optical signal between the first terminal and the second terminal by selecting the first terminal and the second terminal; and a data storage device connected to the information recording/reproducing apparatus,
  wherein said storage device comprises:
    a first input and output terminal for optical communication that is connected to the first channel of the associated optical communication line which is connected to the optical signal processing device,
    a second input and output terminal for optical communication that is connected to the second channel of the associated optical communication line which is connected to the optical signal processing device, and
    a switch portion that switches between the first channel and the second channel of the associated optical communication line which is connected to the optical signal processing device.

2. An information recording/reproducing system comprising:
  an information recording/reproducing apparatus including:
    a recording/reproducing portion that performs either recording or reproducing the data stream;
    an optical signal processing portion that processes an optical signal based on the data stream,
      wherein the optical signal processing device includes:
        a first terminal that inputs and outputs the optical signal, said terminal being connected to a first channel of an associated optical communication line;
        a second terminal that inputs and outputs the optical signal, said terminal being connected to a second channel of the associated optical communication line; and
        a switch portion for optical communication that selects a specific connection state from different connection states according to different switch connections, said switch portion being connected to the first and second terminals and the optical signal processing portion,
      wherein the different connection states include:
        a first connection state for transmitting the optical signal via the first terminal by selecting the first terminal;
        a second connection state for transmitting the optical signal via the second terminal by selecting the second terminal; and
        a third connection state for transmitting the optical signal between the first terminal and the second terminal by selecting the first terminal and the second terminal; and
  a data storage device connected to the information recording/reproducing apparatus through the associated optical communication line which is connected to the optical signal processing device of the recording/reproducing device,
    wherein said storage device comprises:
      a first input and output terminal for optical communication that is connected to the first channel of the associated optical communication line which is connected to the optical signal processing device,
      a second input and output terminal for optical communication that is connected to the second channel of the associated optical communication line which is connected to the optical signal processing device, and
      a switch portion that switches between the first channel and the second channel of the associated optical communication line which is connected to the optical signal processing device.

* * * * *